(12) United States Patent
Evenson et al.

(10) Patent No.: US 10,592,286 B2
(45) Date of Patent: *Mar. 17, 2020

(54) HIGHLY AVAILABLE DISTRIBUTED QUEUE USING REPLICATED MESSAGES

(71) Applicant: Amazon Technologies, Inc., Seattle, WA (US)

(72) Inventors: Andrew Ross Evenson, Seattle, WA (US); Ayan Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,405

(22) Filed: Jul. 13, 2018

(65) Prior Publication Data
US 2018/0341523 A1 Nov. 29, 2018

Related U.S. Application Data

(63) Continuation of application No. 14/752,798, filed on Jun. 26, 2015, now Pat. No. 10,025,628.

(51) Int. Cl.
*G06F 9/50* (2006.01)
*G06F 9/48* (2006.01)
(Continued)

(52) U.S. Cl.
CPC .............. *G06F 9/50* (2013.01); *G06F 9/46* (2013.01); *G06F 9/466* (2013.01); *G06F 9/48* (2013.01); *G06F 9/4843* (2013.01); *G06F 9/4862* (2013.01); *G06F 9/4868* (2013.01); *G06F 9/4881* (2013.01); *G06F 9/5027* (2013.01); *G06F 9/5038* (2013.01);
(Continued)

(58) Field of Classification Search
CPC ... G06F 9/46; G06F 9/466; G06F 9/48; G06F 9/4843; G06F 9/4862; G06F 9/4868; G06F 9/4881; G06F 9/5027; G06F 9/5038; G06F 17/30; G06F 17/30194; G06F 17/30212; G06F 17/30215; G06F 17/30575; G06F 17/30578; G06F 17/30581
See application file for complete search history.

(56) References Cited

U.S. PATENT DOCUMENTS 7,450,503 B1 11/2008 Ginjpalli et al.
7,984,094 B2 7/2011 Riley et al.
(Continued)

*Primary Examiner* — Charles M Swift
(74) *Attorney, Agent, or Firm* — Robert C. Kowert; Kowert, Hood, Munyon, Rankin & Goetzel, P.C.

(57) ABSTRACT

Methods and systems for implementing a highly available distributed queue using replicated messages are disclosed. An enqueue request is received from a client at a particular queue host of a plurality of queue hosts. The enqueue request comprises a message and a replica count greater than one. One or more copies of a replication request are sent from the particular queue host to one or more additional queue hosts. The replication request comprises the message. The quantity of copies of the replication request is determined based at least in part on the replica count. An initial replica of the message is enqueued at the particular queue host. One or more additional replicas of the message are enqueued at the one or more additional queue hosts. A quantity of the one or more additional replicas is determined based at least in part on the replica count.

20 Claims, 21 Drawing Sheets

(51) Int. Cl.
*G06F 9/46* (2006.01)
*G06F 16/00* (2019.01)
*G06F 16/27* (2019.01)
*G06F 16/182* (2019.01)
*G06Q 10/10* (2012.01)
*G06F 9/54* (2006.01)

(52) U.S. Cl.
CPC ............ *G06F 9/5083* (2013.01); *G06F 9/546* (2013.01); *G06F 16/00* (2019.01); *G06F 16/182* (2019.01); *G06F 16/184* (2019.01); *G06F 16/1844* (2019.01); *G06F 16/27* (2019.01); *G06F 16/273* (2019.01); *G06F 16/275* (2019.01); *G06Q 10/10* (2013.01)

(56) References Cited

U.S. PATENT DOCUMENTS

| | | | |
|---|---|---|---|
| 8,032,578 B2 | 10/2011 | Riley et al. | |
| 8,166,097 B2 | 4/2012 | Riley et al. | |
| 8,392,920 B2 | 3/2013 | Ostrovsky et al. | |
| 9,304,815 B1* | 4/2016 | Vasanth | G06F 9/4881 |
| 2005/0086272 A1* | 4/2005 | Novik | G06F 16/275 |
| 2005/0086384 A1* | 4/2005 | Ernst | H04L 12/00 |
| | | | 709/248 |
| 2006/0215569 A1* | 9/2006 | Khosravy | G06F 16/275 |
| | | | 370/241 |
| 2008/0005199 A1* | 1/2008 | Chen | H04L 67/1095 |
| 2010/0325190 A1* | 12/2010 | Riley | G06F 9/546 |
| | | | 709/201 |
| 2011/0185358 A1* | 7/2011 | Ostrovsky | G06F 9/4881 |
| | | | 718/100 |
| 2012/0284229 A1* | 11/2012 | Kim | H04L 67/1095 |
| | | | 707/634 |
| 2014/0164831 A1* | 6/2014 | Merriman | G06F 11/1458 |
| | | | 714/20 |
| 2015/0006478 A1* | 1/2015 | Raymond | G06F 16/27 |
| | | | 707/610 |
| 2015/0127833 A1* | 5/2015 | Hegdal | G06F 9/5016 |
| | | | 709/226 |
| 2015/0248434 A1* | 9/2015 | Avati | G06F 16/184 |
| | | | 707/615 |
| 2015/0324388 A1* | 11/2015 | Benke | G06F 3/0652 |
| | | | 707/610 |
| 2015/0356161 A1* | 12/2015 | Slavicek | G06F 16/27 |
| | | | 707/636 |
| 2016/0142479 A1* | 5/2016 | Darcy | G06F 16/184 |
| | | | 709/219 |
| 2016/0255144 A1* | 9/2016 | Brandwine | G06F 9/45533 |
| | | | 709/226 |

\* cited by examiner

HIGHLY AVAILABLE DISTRIBUTED QUEUE USING REPLICATED MESSAGES

This application is a continuation of U.S. patent application Ser. No. 14/752,798, filed Jun. 26, 2015, now U.S. Pat. No. 10,025,628, which is hereby incorporated by reference herein in its entirety.

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

Such a distributed system may encompass numerous subsystems that work in concert. For example, a distributed system operated by an online merchant may include an ordering system that processes the generation and modification of customer orders of goods and/or services. The same distributed system operated by the online merchant may also include a queuing system that permits tasks to be queued. When a modification to an order is desired, a task may be queued using the queuing system for processing the order modification. If the queuing system is offline, aspects of the ordering system may be unavailable or broken due to the dependency between the ordering system and the queuing system. Such downtime may cause the online merchant to lose sales. Accordingly, it is desirable to provide a queuing system with high availability.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for implementing a highly available distributed queue using replicated messages are described. A fleet of queue hosts and one or more load balancers may implement a distributed queue system. A request to enqueue a message may specify a replica count, and replicas of the message may be stored in various queue hosts throughout the system to meet the replica count. When a client acknowledges the successful processing of a message from a queue, all of the replicas may be destroyed across the various queue hosts. Replicas may be scheduled at various times to reduce the possibility of a message being processed more than once. The load balancer(s) may initially select queue hosts for message replication. Host discovery may be unseeded, and queue hosts may discover one another through the normal processing of queue-related tasks. For example, hosts may discover peers by receiving host identifiers in acknowledgements of replica generation and message processing. The state of a queue at a particular queue host may be logged for efficient recovery. In this manner, a highly available distributed queue may be provided for duplication-tolerant clients.

Figure 1:
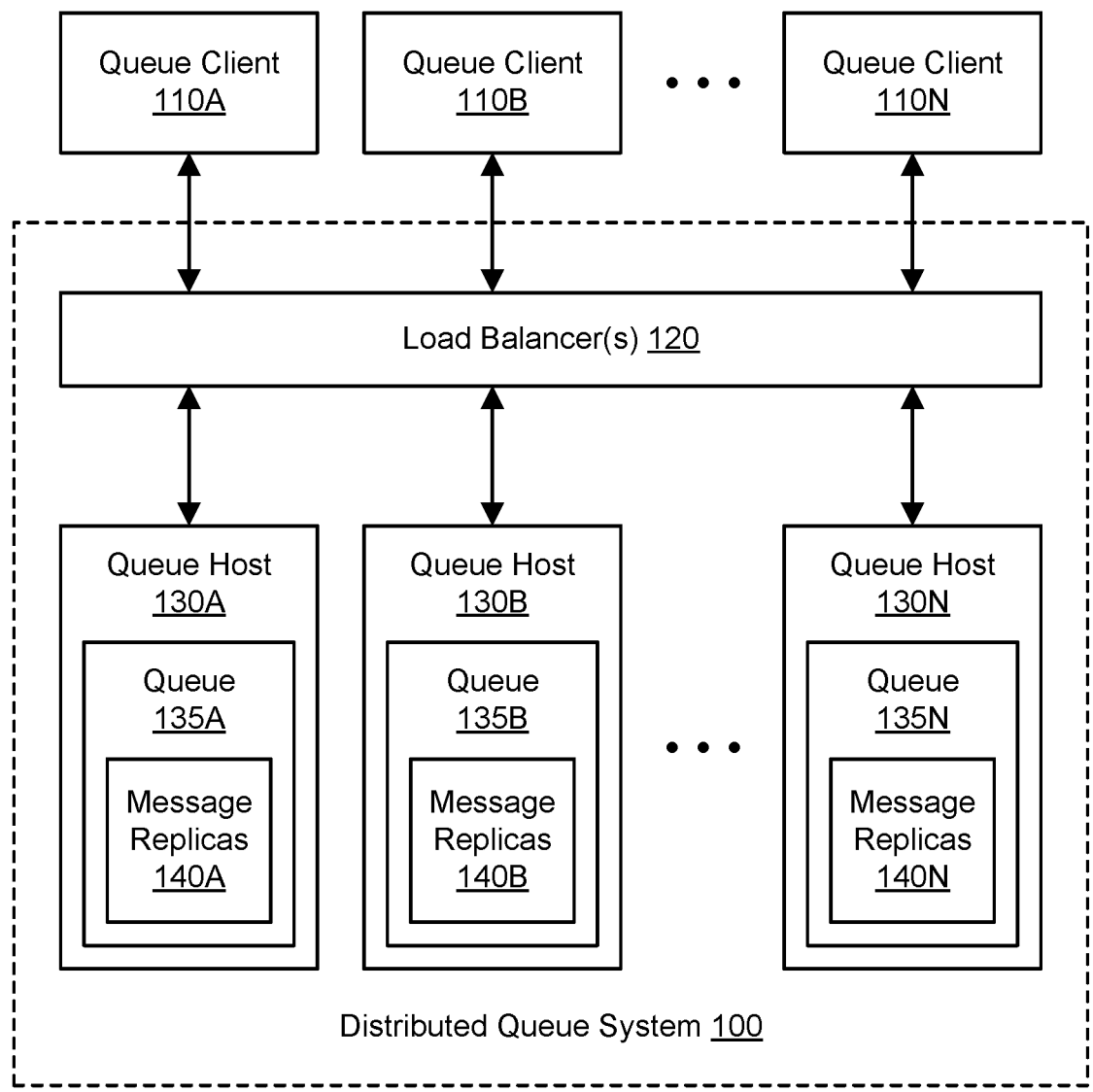
FIG. 1 illustrates an example system environment for a highly available distributed queue using replicated messages, according to one embodiment.

FIG. 1 illustrates an example system environment for a highly available distributed queue using replicated messages, according to one embodiment. A distributed queue system 100 may include one or more load balancers 120 and a plurality of queue hosts (e.g., queue hosts 130A and 130B through 130N). The load balancer(s) 120 and queue hosts 130A-130N may be communicatively coupled to one another using one or more suitable networks. Using a suitable load balancing scheme, the load balancer(s) 120 may select particular queue hosts for performing various queue-related tasks such as enqueuing messages and/or dequeuing messages. Each of the queue hosts 130A-130N may implement a queue, such as queue 135A at queue host 130A, queue 135B at queue host 130B, and queue 135N at queue host 130N. As will be discussed in greater detail below, the queues 135A-135N may store replicas of enqueued messages, such as message replicas 140A and 140B through 140N, to provide greater fault tolerance and higher availability. The number of replicas may vary on a message-by-message basis, e.g., as specified in a request to enqueue a message. As used herein, the terms "message" and "replica" may be used synonymously. No particular replica of a particular message (e.g., the first created replica or the earliest scheduled replica) may be considered a "primary" replica or treated favorably over any other replica of that particular message, except that various replicas may be scheduled for availability at various times.

A plurality of queue clients (e.g., queue clients 110A and 110B through 110N) may interact with the distributed queue system 100. For example, the queue clients 110A-110N may provide messages to be enqueued at the queue hosts 130A-130N and/or may receive and process messages from the queue hosts. The queue clients 110A-110N may represent various clients, client accounts, computing instances, resources, processes, or any suitable combinations thereof. The messages may represent tasks, requests, or operations to be executed or otherwise implemented using appropriate computing resources. For example, a message may describe or reference one or more instructions to be executed or interpreted using source data from one or more indicated data sources and/or storing results in one or more indicated data destinations. A message may be sent from a queue to one of the queue clients 110A-110N as a result of a dequeue request issued by the recipient client, and processing a message may include the client performing (or causing to be performed) the one or more tasks, requests, or operations specified in the message. In one embodiment, the queue clients 110A-110N may communicate with the queue hosts 130A-130N using the load balancer(s) 120. In one embodiment, the identities of the queue hosts 130A-130N may be hidden from the queue clients 110A-110N.

It is contemplated that the distributed queue system 100 may include additional components not shown, fewer components than shown, or different combinations, configurations, or quantities of the components shown. For example, although three queue clients 110A, 110B, and 110N are shown for purposes of example and illustration, it is contemplated that different quantities and configurations of queue clients may be used. Additionally, although three queue hosts 130A, 130B, and 130N are shown for purposes of example and illustration, it is contemplated that different quantities and configurations of queue hosts may be used. Furthermore, any suitable number and configuration of load balancers 120 may be used with the distributed queue system 100.

Figure 13:
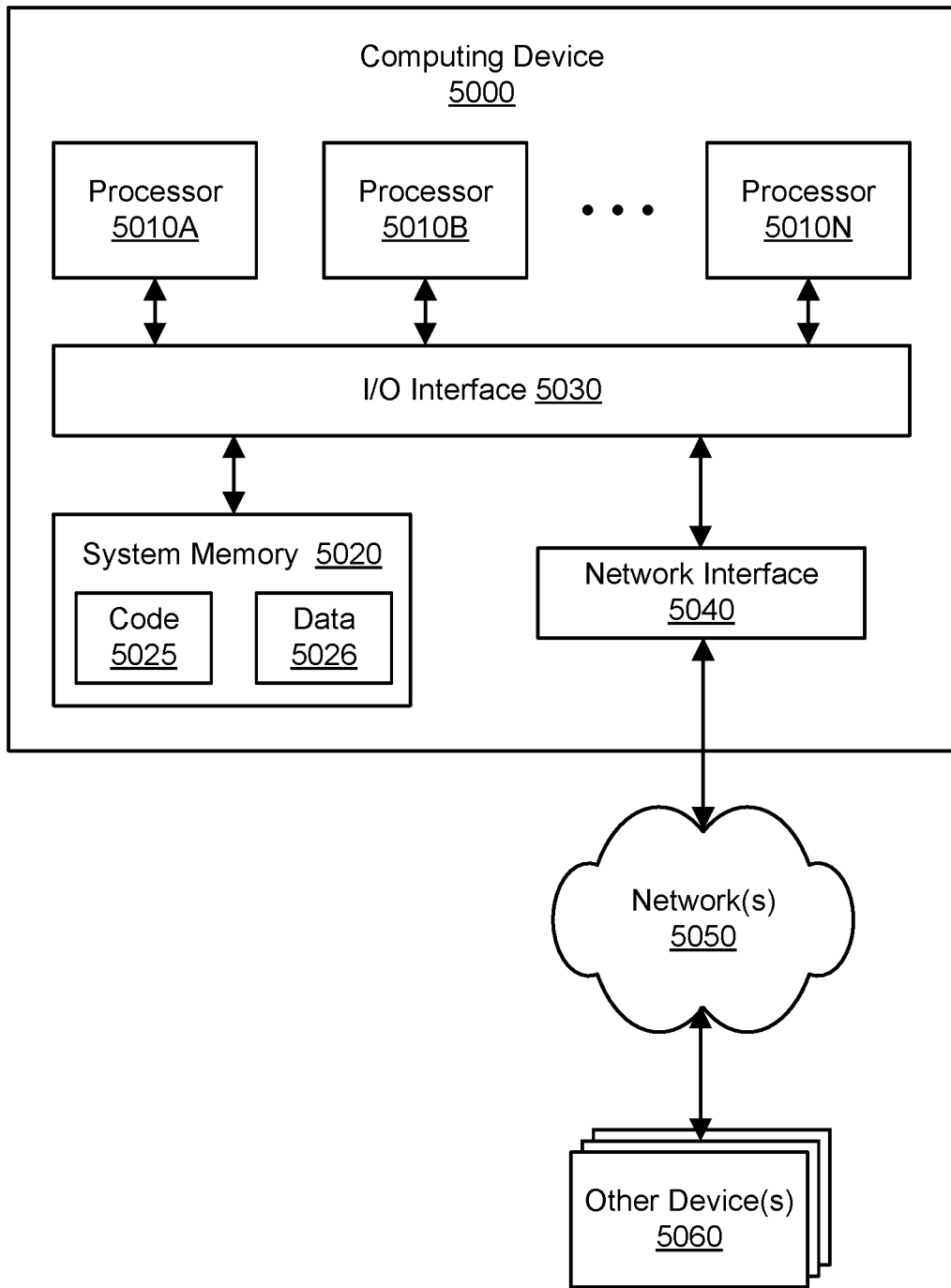
FIG. 13 illustrates an example of a computing device that may be used in some embodiments.

The distributed queue system 100 may comprise one or more computing devices, any of which may be implemented by the example computing device 5000 illustrated in FIG. 13. In various embodiments, portions of the functionality of the queue clients 110A-110N and/or distributed queue system 100, including the queue hosts 130A-130N and load balancer(s) 120, may be provided by the same computing device or by any suitable number of different computing devices. If any of the components of the distributed queue system 100 are implemented using different computing devices, then the components and their respective computing devices may be communicatively coupled, e.g., via a network. Each of the illustrated components may represent any combination of software and hardware usable to perform their respective functions.

In some embodiments, the queue hosts 130A-130N and/or queue clients 110A-110N may be implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 5000 illustrated in FIG. 13.

In one embodiment, a suitable component of the distributed queue system 100 may select and/or provision the queue hosts 130A-130N and/or load balancer(s) 120. For example, the queue hosts 130A-130N and/or load balancer(s) 120 may be provisioned from a suitable pool of available computing instances. In one embodiment, additional computing instances may be added to the queue hosts 130A-130N and/or load balancer(s) 120 as needed. In one embodiment, computing instances may be returned to the pool of available computing instances queue hosts 130A-130N and/or load balancer(s) 120 if the computing instances are not needed at a particular point in time.

In one embodiment, the functionality of the distributed queue system 100 may be provided to clients 110A-110N using a provider network. For example, the functionality of the distributed queue system 100 may be presented to clients as a web-accessible service. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In one embodiment, operators of provider networks may implement a flexible set of resource reservation, control, and access interfaces for their clients. For example, a provider network may implement a programmatic resource reservation interface (e.g., via a web site or a set of web pages) that allows clients to learn about, select, purchase access to, and/or reserve resources. In one embodiment, queue resources may be reserved on behalf of clients using a client-accessible service that implements the distributed queue system 100. According to one such embodiment, a distributed queue system 100 in such an environment may receive specifications for the various messages to be enqueued, e.g., a description of one or more tasks and an indication of a source of input data to be used by the task(s). In response, the distributed queue system 100 may enqueue the task(s) using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client.

In one embodiment, clients 110A-110N may use one or more suitable interfaces (such as one or more web pages, an application programming interface [API], or a command-line interface [CLI]) to provide the various messages to be enqueued and otherwise configure the distributed queue system 100. In one embodiment, a client may be able to view the current status of the messages using the interface(s). In one embodiment, additional information about messages in the distributed queue system 100 may be available via the interface(s), such as program output, error logs, exception logs, and so on.

Figure 2:
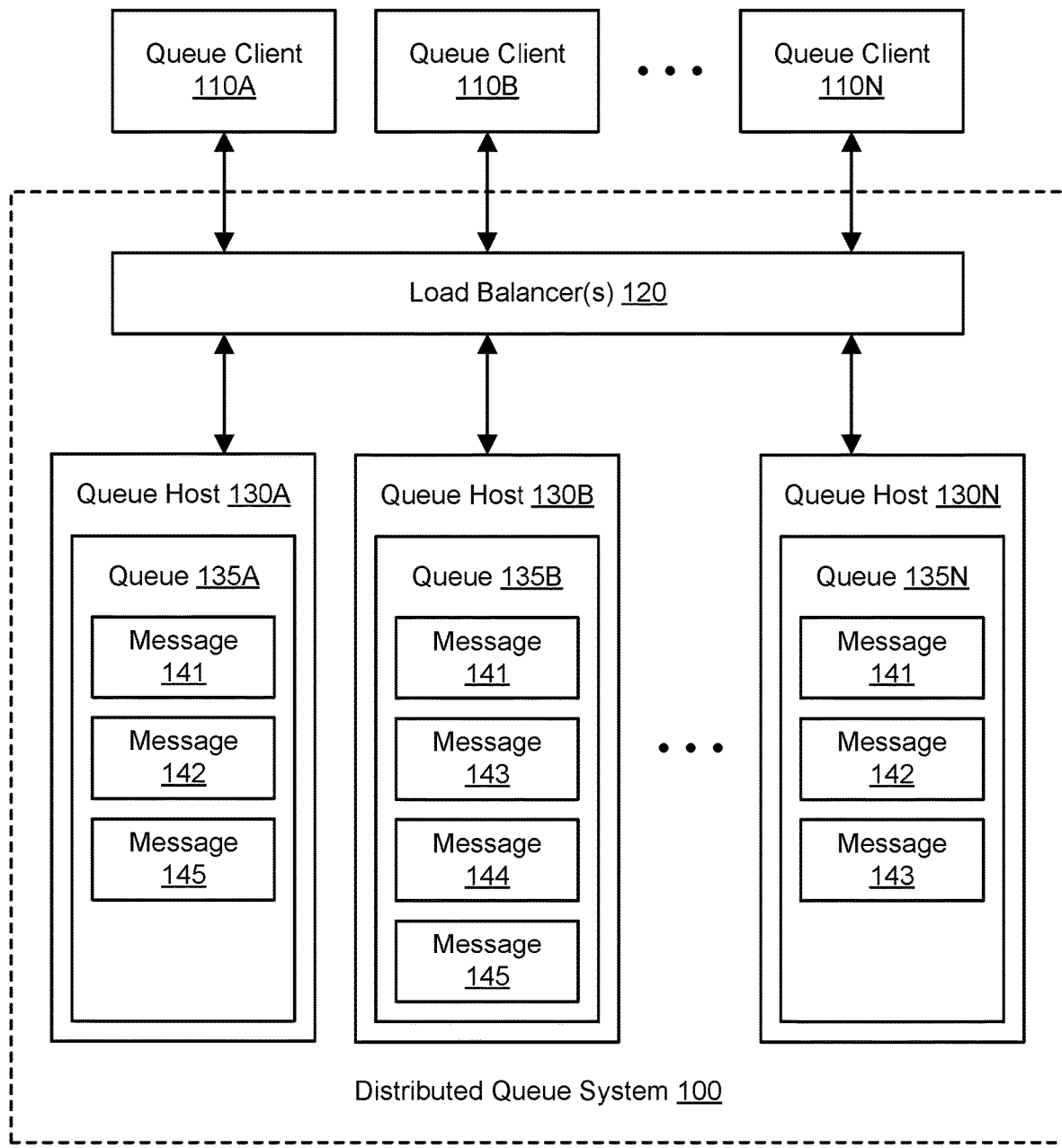
FIG. 2 illustrates further aspects of the example system environment for a highly available distributed queue using replicated messages, including examples of message replicas, according to one embodiment.

FIG. 2 illustrates further aspects of the example system environment for a highly available distributed queue using replicated messages, including examples of message replicas, according to one embodiment. As discussed above, the queues 135A-135N at the respective queue hosts 130A-130N may store replicas of enqueued messages, such as message replicas 140A and 140B through 140N, to provide greater fault tolerance and higher availability. Replicas of a message may also be referred to herein as copies of a message or instances of a message. The number of replicas may vary on a message-by-message basis, e.g., as specified in a request to enqueue a message. For example, the enqueue request for message 141 may specify a replica count of three. Accordingly, the queue hosts 130A-130N may store three replicas of the message 141, e.g., in queues 135A, 135B, and 135N. Each of the various replicas of the message 141 may specify the same tasks or operations to be performed. In one embodiment, some metadata may vary among various ones of the replicas of the message 141. For example, each replica of the message 141 may be scheduled for a different time, such that a particular replica may be locked or made invisible in the corresponding queue until its scheduled time has arrived. As another example, the enqueue request for message 142 may specify a replica count of two, and the queue hosts 130A-130N may store two replicas of the message 142. Similarly, the enqueue request for message 143 may specify a replica count of two, and the queue hosts 130A-130N may store two replicas of the message 143. The enqueue request for message 143 may specify a replica count of one, and the queue hosts 130A-130N may store only one replica of the message 144. As also shown in the example of FIG. 2, the enqueue request for message 145 may specify a replica count of two, and the queue hosts 130A-130N may store two replicas of the message 145. An example of the creation of replicated messages according to one embodiment is discussed as follows with respect to FIG. 3A through FIG. 3F.

Figure 3A:
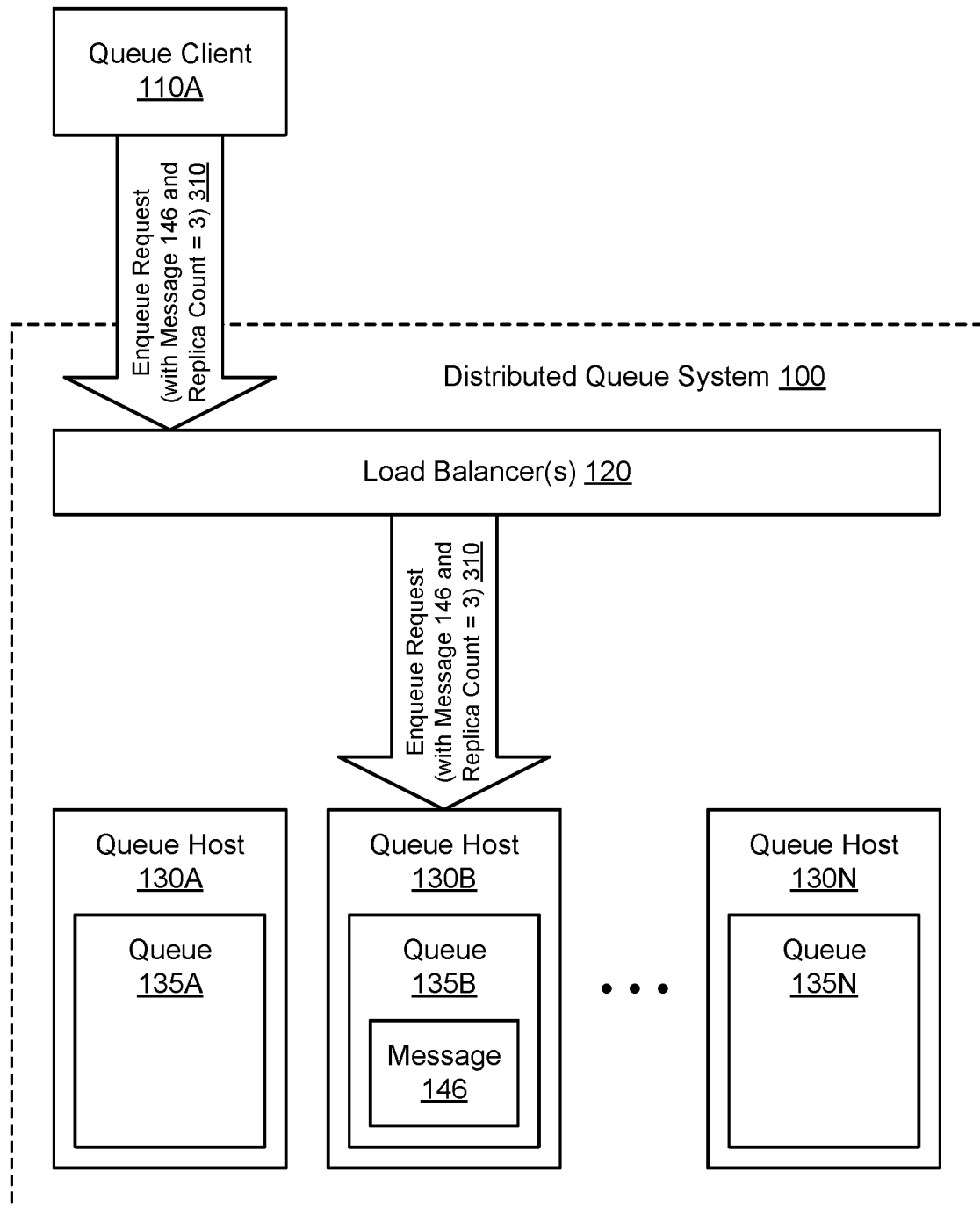
FIG. 3A illustrates an example of processing an enqueue request in a highly available distributed queue using replicated messages, including one or more load balancers forwarding the enqueue request to a queue host, according to one embodiment.

FIG. 3A illustrates an example of processing an enqueue request in a highly available distributed queue using replicated messages, including one or more load balancers forwarding the enqueue request to a queue host, according to one embodiment. A queue client 110A may send an enqueue request 310 to the load balancer(s) 120. The enqueue request 310 may specify a message 146 that includes one or more tasks or operations to be performed. The enqueue request 310 may also specify a replica count for the message 146. The replica count may indicate the number of replicas of the message 146 to be stored in the queue system 100. In the example shown in FIG. 3A, the replica count for the message 146 is three. However, any suitable replica count may be specified. In one embodiment, a cost assessed to the client 110A for use of the queue system 100 may vary based at least in part on the replica count, such that the cost may tend to increase as the replica count increases. In one embodiment, the queue client 110A may use any suitable interface(s) (e.g., an application programming interface) and/or interconnection(s) to send the enqueue request 310 to the load balancer(s). Upon receipt of the enqueue request 310, the load balancer(s) 120 may use any suitable load balancing scheme(s) to select a queue host to receive the enqueue request. In one embodiment, the load balancer(s)

120 may use a "least connections" load balancing scheme. In the example shown in FIG. 3A, the load balancer(s) may select queue host 130B and send the enqueue request 310 to the selected queue host. Upon receipt of the enqueue request 310, the queue host 130B may enqueue the message 146 specified in the enqueue request 310 (i.e., by placing the message 146 in the queue 135B).

Figure 3B:
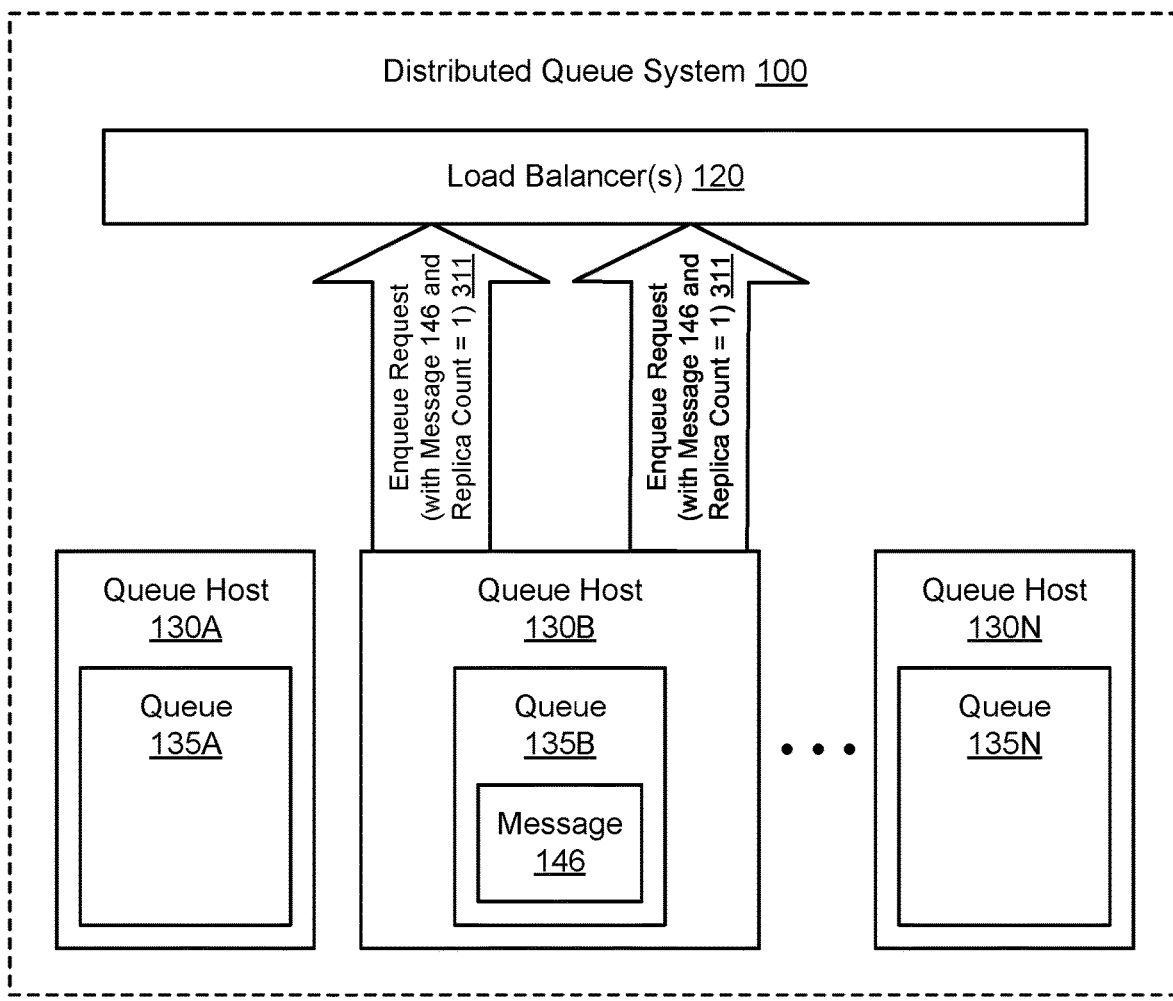
FIG. 3B illustrates an example of processing an enqueue request in a highly available distributed queue using replicated messages, including a primary queue host issuing additional enqueue requests to secondary queue hosts using the load balancer(s), according to one embodiment.

FIG. 3B illustrates an example of processing an enqueue request in a highly available distributed queue using replicated messages, including a primary queue host issuing additional enqueue requests to secondary queue hosts using the load balancer(s), according to one embodiment. The queue host 130B that initially stores the message 146 may be referred to as the primary host with respect to message 146. The queue host 130B may be referred to as the primary host with respect to its role in replica generation; however, the queue host 130B may take no special role in management of replicas once the operations shown in FIG. 3A through FIG. 3F have been completed. To satisfy the replica count specified in the enqueue request, the primary host 130B may generate modified enqueue requests 311, also referred to herein as replication requests. The number of copies of the modified enqueue request 311 may be based at least in part on the replica count of the original enqueue request 310. Because the specified replica count in this example is three, and the primary host 130B has already enqueued (or will soon enqueue) one replica of the message, the primary host may send two replication requests 311. In one embodiment, the primary host 130B may send the modified enqueue requests 311 to the load balancer(s) 120. The modified enqueue requests 311 may include an identifier of the primary host 130B so that acknowledgements may be returned to that host 130B. In one embodiment, the queue host 130B may send the modified enqueue requests 311 before the queue host 130B has added the message 146 to the queue 135B. The message 146 in the queue 135B may be referred to as an initial replica.

In one embodiment, the modified enqueue requests 311 may include the message 146 and a replica count of one. In one embodiment, the modified enqueue requests 311 may be sent using the same API (application programming interface) as the enqueue request 310 but may vary in the replica count. In another embodiment, the modified enqueue requests 311 may include the message 146 but no replica count, and the other queue hosts may treat such as a message as specifying a default replica count of one. In one embodiment, the queue host 130B may use any suitable interface(s) (e.g., an application programming interface) and/or interconnection(s) to send the modified enqueue requests 311 to the load balancer(s).

Figure 3C:
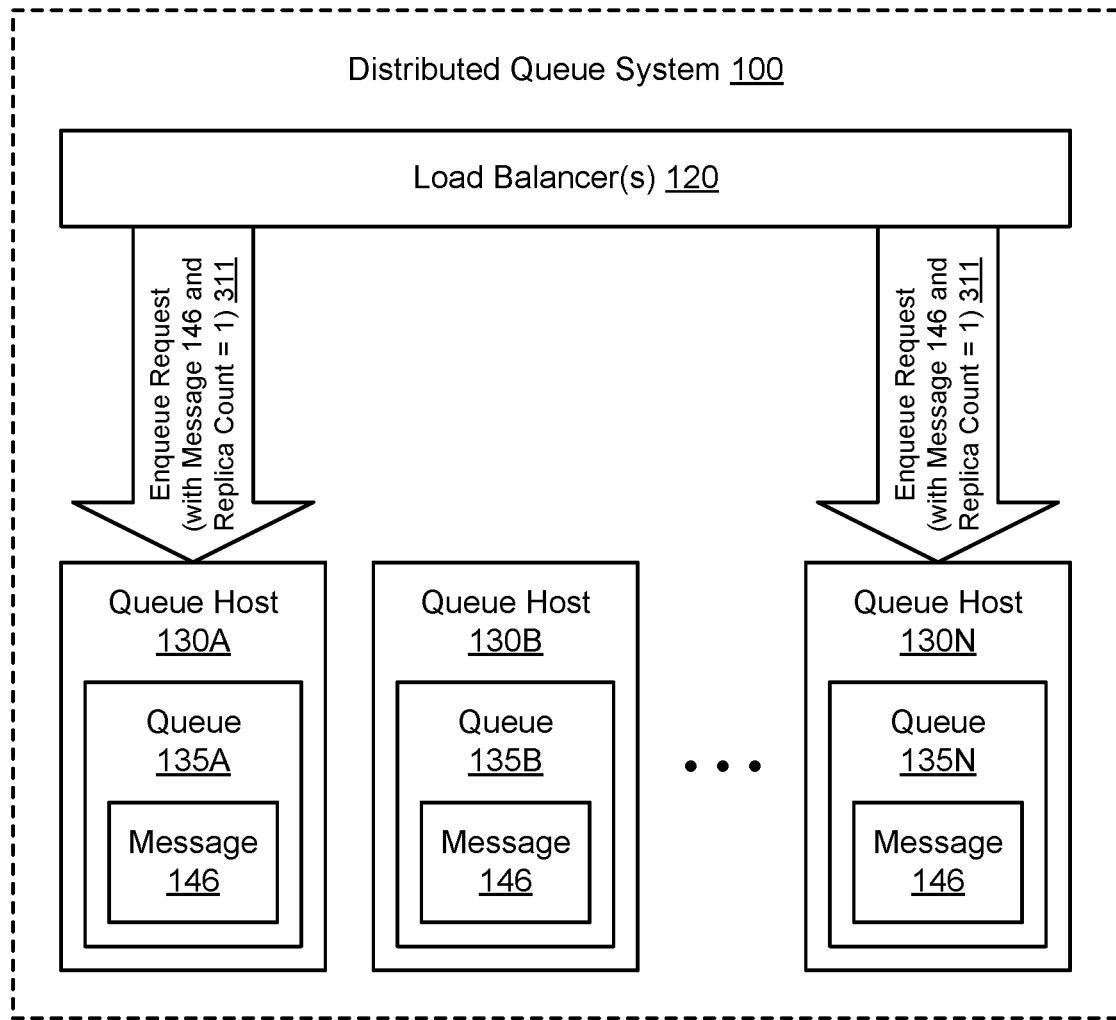
FIG. 3C illustrates an example of processing an enqueue request in a highly available distributed queue using replicated messages, including the load balancer(s) selecting the secondary queue hosts and delivering the additional enqueue requests, according to one embodiment.

FIG. 3C illustrates an example of processing an enqueue request in a highly available distributed queue using replicated messages, including the load balancer(s) selecting the secondary queue hosts and delivering the additional enqueue requests, according to one embodiment. Upon receipt of the modified enqueue requests 311, the load balancer(s) 120 may use any suitable load balancing scheme(s) to select one or more queue hosts to receive the requests 311. In one embodiment, the load balancer(s) 120 may use a "least connections" load balancing scheme. In the example shown in FIG. 3C, the load balancer(s) may select queue hosts 130A and 130N, send one copy of the modified enqueue request 311 to the selected queue host 130A, and send one copy of the modified enqueue request 311 to the selected queue host 130N. The queue hosts that receive the modified enqueue requests 311 may be referred to herein as secondary hosts. The queue hosts 130A and 130N may be referred to as secondary hosts with respect to their role in replica generation; however, the secondary queue hosts 130A and 130N and the primary queue host 130B may take a similar role in management of replicas once the operations shown in FIG. 3A through FIG. 3F have been completed. In one embodiment, the modified enqueue requests 311 may include identifiers of the primary host and secondary host(s), and the identifiers may be associated with the message 146. Upon receipt of the modified enqueue requests 311, the queue hosts 130A and 130N may enqueue the message 146 specified in the request. Because the replica count is specified as one in the modified enqueue requests 311, the secondary hosts 130A and 130N may take no further action to create additional replicas of the message 146. In this manner, the distributed queue system 100 may store a number of replicas of a message based at least in part on a replica count specified in the original enqueue request for the message.

The modified enqueue requests 311 may include metadata that causes the additional replicas of the message 146 to be scheduled (e.g., for enqueuing or delivery) at a later time than the corresponding replica at the primary host 130B. For example, the initial replica at queue host 130B may be immediately available, and each of the additional replicas may be scheduled N minutes later than the previous replica. In one embodiment, no two replicas of the same message may be scheduled at the same time. In one embodiment, a message may be made unavailable in a queue (e.g., by being locked or made invisible) until its scheduled time has arrived. In this manner, the chances may be reduced of multiple replicas of the same message being dequeued and processed simultaneously.

In one embodiment, the load balancer(s) 120 may send multiple copies of the modified enqueue request 311 to a particular one of the queue hosts 130A-130N, and the recipient queue host may enqueue multiple copies of the message accordingly. In one embodiment, the load balancer(s) 120 may send one or more copies of the modified enqueue request 311 back to the primary host 130B. If all of the replication requests are directed back to the primary host 130B, then the primary host may indicate to the client 110B that the enqueue request 310 has failed. Replication requests may be sent through the load balancer(s) 120 when the primary host has not discovered a sufficient number of secondary hosts to meet the replica count. In one embodiment, one or more replication requests may be sent directly from one queue host to another queue host, e.g., if the recipient host has previously been discovered by the sending host. At initialization, a queue host may know of no other queue hosts, and discovery of other queue hosts may occur through an unseeded discovery process using normal or routine queue-related tasks. Unseeded discovery of hosts is discussed with reference to FIG. 7 through FIG. 9.

Figure 3D:
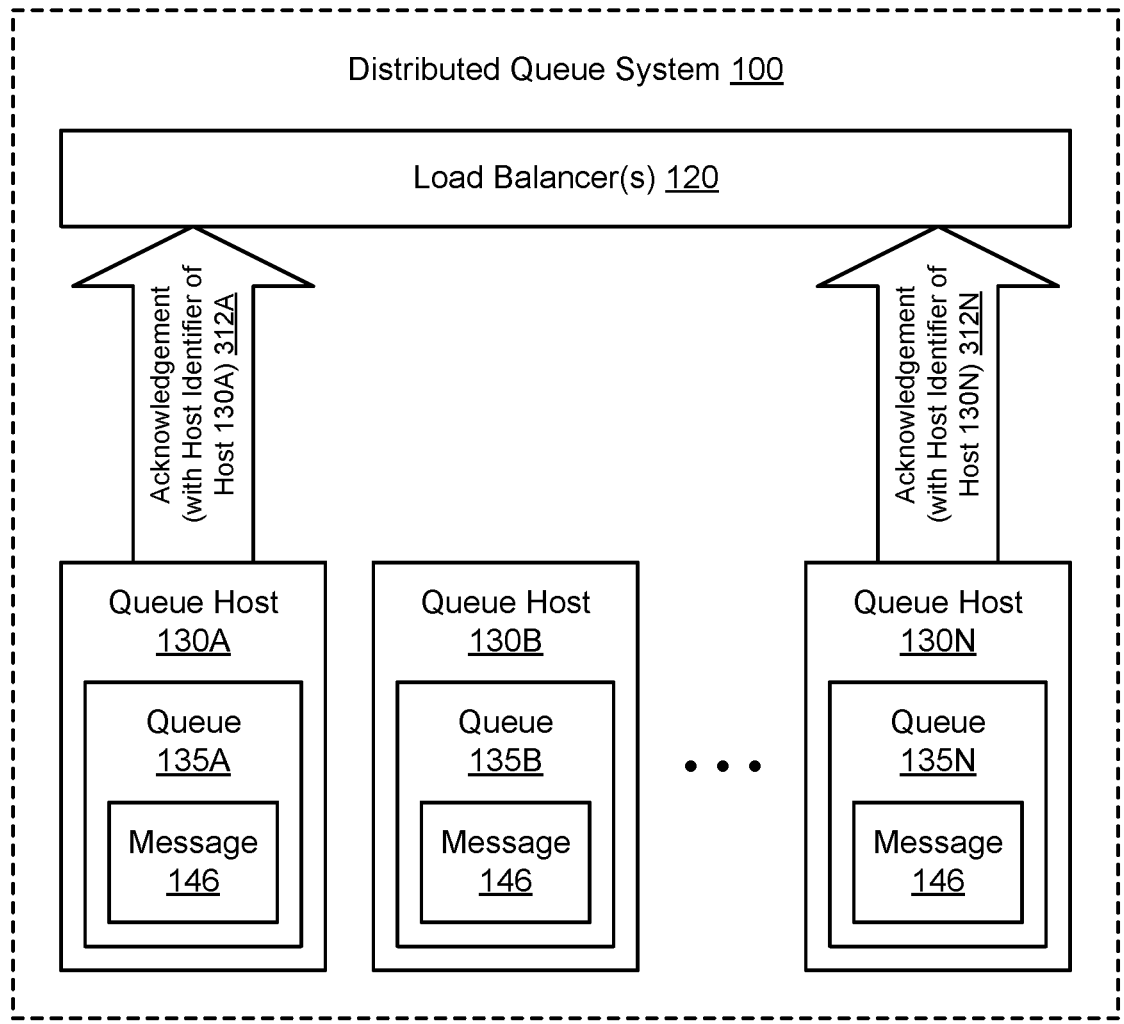
FIG. 3D illustrates an example of processing an enqueue request in a highly available distributed queue using replicated messages, including the secondary queue hosts acknowledging the enqueuing of message replicas, according to one embodiment.

FIG. 3D illustrates an example of processing an enqueue request in a highly available distributed queue using replicated messages, including the secondary queue hosts acknowledging the enqueuing of message replicas, according to one embodiment. After the secondary hosts 130A and 130N have enqueued the message 146 responsive to the replication request 311, the secondary hosts may acknowledge that the message 146 was successfully enqueued. Accordingly, the queue host 130A may send an acknowledgement 312A to the load balancer(s) 120, and the queue host 130N may send an acknowledgement 312N to the load balancer(s) 120. The acknowledgement 312A may include a host identifier of the queue host 130A, and the acknowledgement 312N may include a host identifier of the queue host 130N. The host identifiers may include any suitable information to identify the respective hosts, including a network address or hostname that is unique within the provider network and/or distributed queue system 100. In one embodiment, the acknowledgements 312A and 312N may be addressed to the primary host 130B based on a host identifier of the primary host that was included in the replication requests.

Figure 3E:
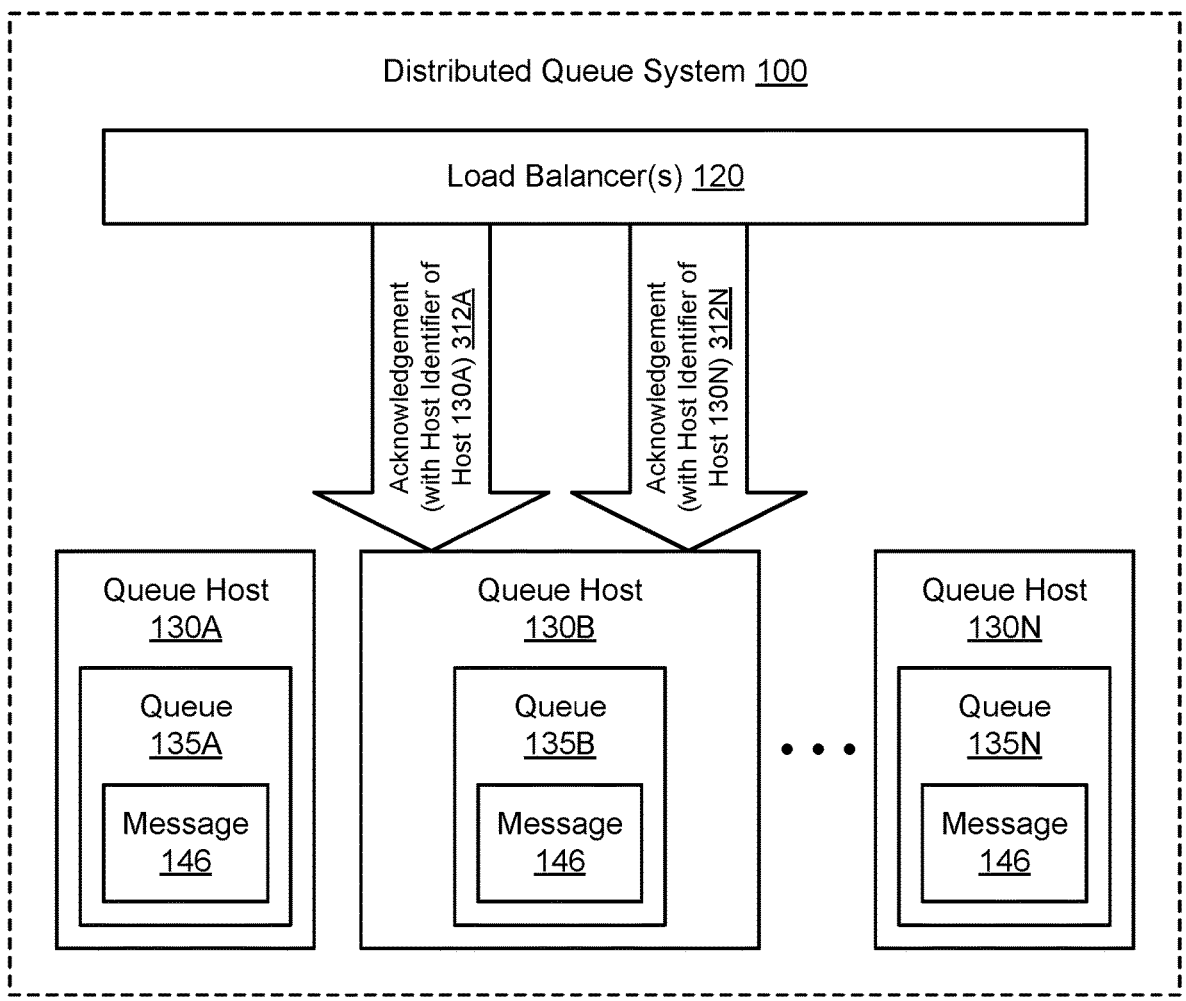
FIG. 3E illustrates an example of processing an enqueue request in a highly available distributed queue using replicated messages, including the load balancer(s) forwarding the acknowledgements to the primary queue host, according to one embodiment.

FIG. 3E illustrates an example of processing an enqueue request in a highly available distributed queue using replicated messages, including the load balancer(s) forwarding the acknowledgements to the primary queue host, according to one embodiment. As discussed above, the secondary host 130A may send an acknowledgement 312A of message enqueuing to the load balancer(s) 120, and the secondary host 130N may send an acknowledgement 312N of message enqueuing to the load balancer(s) 120. As shown in FIG. 3E, the load balancer(s) may forward these acknowledgements 312A and 312N to the primary host 130B. In this manner, the primary host 130B may verify that the proper number of replicas have been created (in accordance with the replica count in the enqueue request 310). The primary host 310B may also obtain the host identifiers of the secondary hosts 310A and 310N as specified in the acknowledgements 312A and 312N. In one embodiment, the identifiers of the secondary hosts 310A and 310N may be associated with the message 146 at the primary host 310B.

Figure 3F:
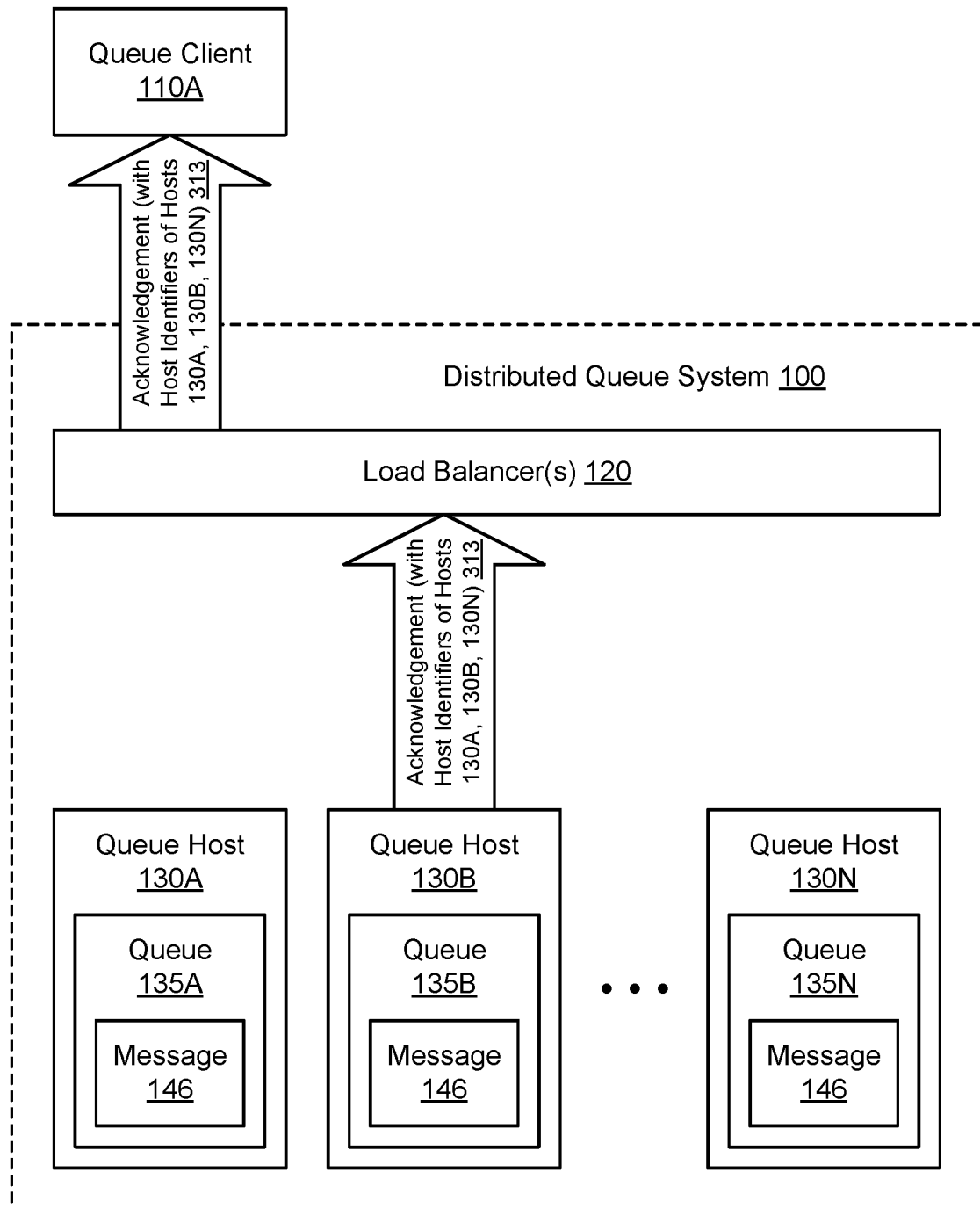
FIG. 3F illustrates an example of processing an enqueue request in a highly available distributed queue using replicated messages, including the primary queue host sending an acknowledgement to the client using the load balancer(s), according to one embodiment.

FIG. 3F illustrates an example of processing an enqueue request in a highly available distributed queue using replicated messages, including the primary queue host sending an acknowledgement to the client using the load balancer(s), according to one embodiment. The primary host 130B may send an acknowledgement 313 that indicates that the message 146 was successfully enqueued with the requested number of replicas. The acknowledgement 313 may include host identifiers of host 130A, 130B, and 130N, i.e., the hosts that store the replicas of the message 146 in this example. In one embodiment, the host identifiers in the acknowledgement may be encrypted or encoded so that entities outside the distributed queue system 100 (e.g., queue clients 110A-110N) are prevented from identifying or initiating direct communication with the hosts. The primary host may send the acknowledgement 313 to the load balancer(s) 120, and the load balancer(s) 120 may forward the acknowledgement 313 to the client 110A.

Figure 4A:
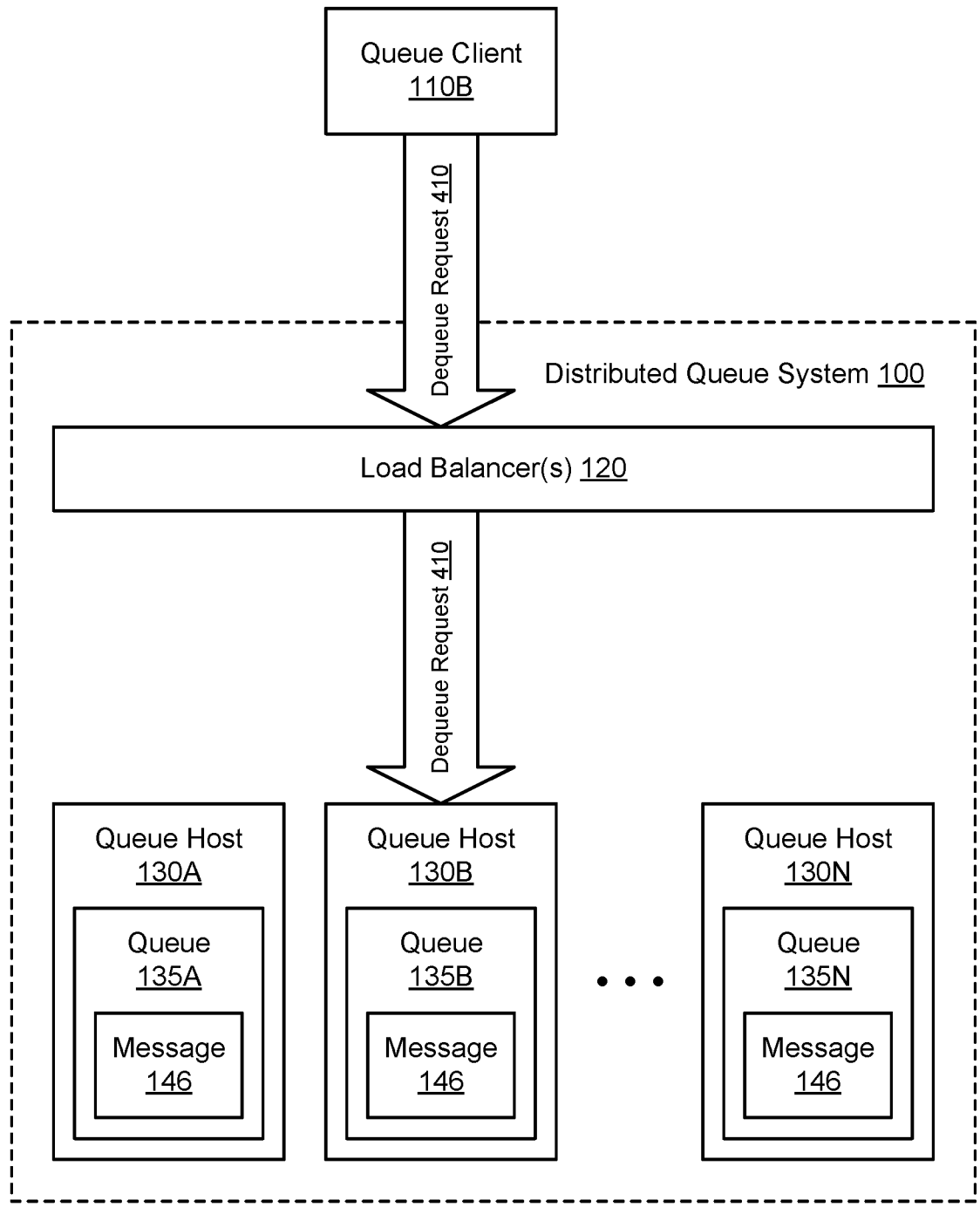
FIG. 4A illustrates an example of processing a dequeue request in a highly available distributed queue using replicated messages, including one or more load balancers forwarding the dequeue request to a queue host, according to one embodiment.

FIG. 4A illustrates an example of processing a dequeue request in a highly available distributed queue using replicated messages, including one or more load balancers forwarding the dequeue request to a queue host, according to one embodiment. A queue client 110B may send a dequeue request 410 to the load balancer(s) 120. The dequeue request 410 may represent a request for the client to receive a message from the queue system 100, e.g., a message from one of the queues 135A-135N. In one embodiment, the dequeue request 410 may specify a type or category of message to be returned or may otherwise restrict the type of message to be returned. For example, if the queue system 100 is being used by an ordering system of an online merchant to enqueue order-processing tasks but is also being used by one or more other systems to enqueue other types of tasks, the dequeue request may specify one of the order-processing messages. In one embodiment, the queue client 110B may use any suitable interface(s) (e.g., an application programming interface) and/or interconnection(s) to send the dequeue request to the load balancer(s) 120. Upon receipt of the dequeue request 410, the load balancer(s) 120 may use any suitable load balancing scheme(s) to select a queue host to receive the enqueue request. In one embodiment, the load balancer(s) 120 may use a "least connections" load balancing scheme. In the example shown in FIG. 4A, the load balancer(s) may select queue host 130B and send the dequeue request 410 to the selected queue host.

Figure 4B:
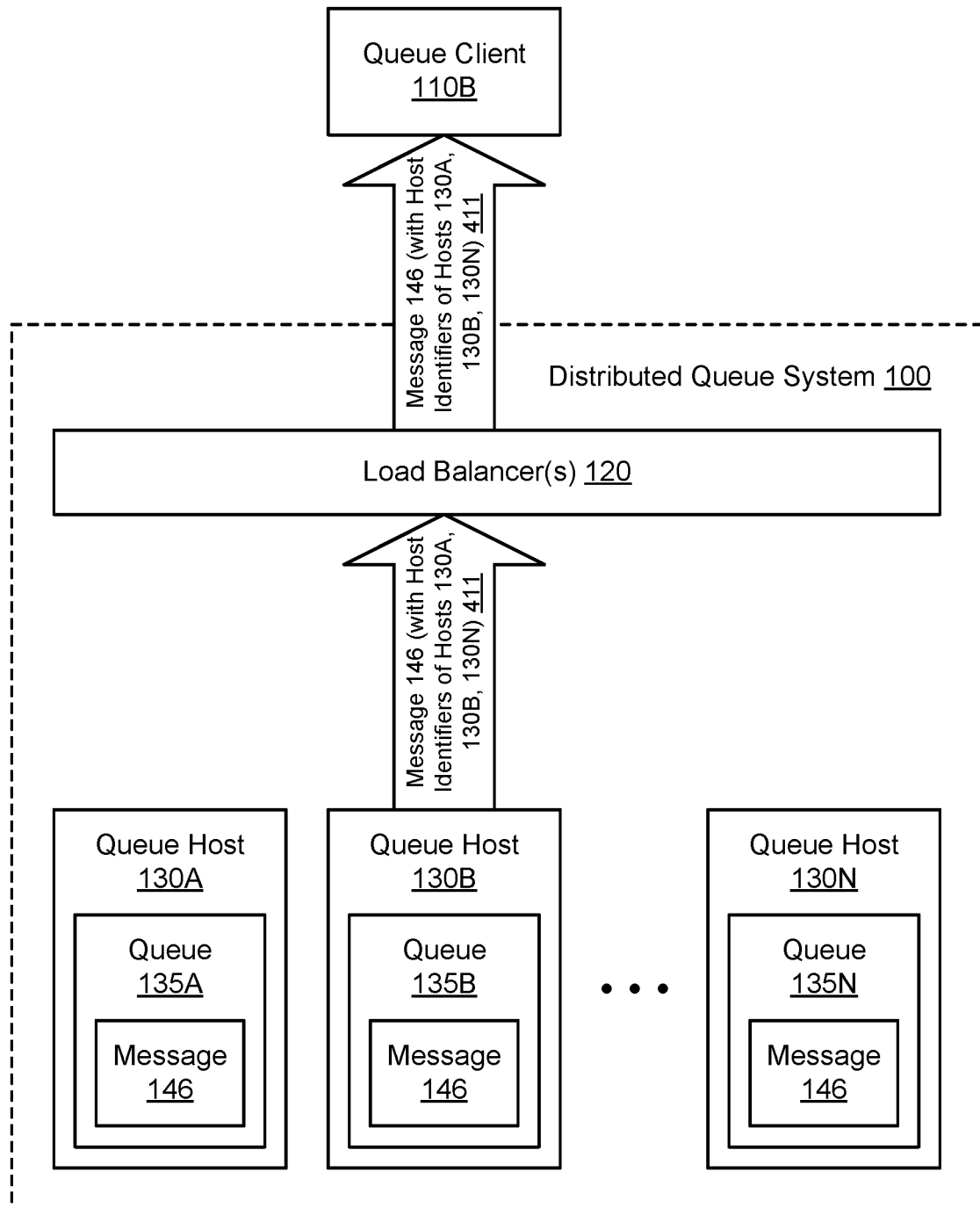
FIG. 4B illustrates an example of processing a dequeue request in a highly available distributed queue using replicated messages, including the queue host sending a queue message to the client using the load balancer(s), according to one embodiment.

FIG. 4B illustrates an example of processing a dequeue request in a highly available distributed queue using replicated messages, including the queue host sending a queue message to the client using the load balancer(s), according to one embodiment. Upon receipt of the dequeue request 410, the queue host 130B may take the next available message from the queue 135B and return it to the requesting client 110B. In the example shown in FIG. 4B, the next available message in the queue 135B is message 146. When the message 146 is sent to the load balancer(s) 120 and forwarded to the queue client 110B, the message 146 may be placed in a package 411 with the host identifiers of all the queue hosts 130A, 130B, and 130N that store replicas of the message 146. The host identifiers may be included in the package 411 so that the replicas may be destroyed at all the hosts 130A-130N after successful processing of the message by the client 110B. In one embodiment, the message 146 may be made unavailable in the queue 135B (e.g., by being locked or made invisible) after being sent to the client 110B. In one embodiment, the message 146 may remain in the queue and be rescheduled for availability at a later time (e.g., N minutes from the current time) in case the client 110B fails to process the message successfully.

Figure 5A:
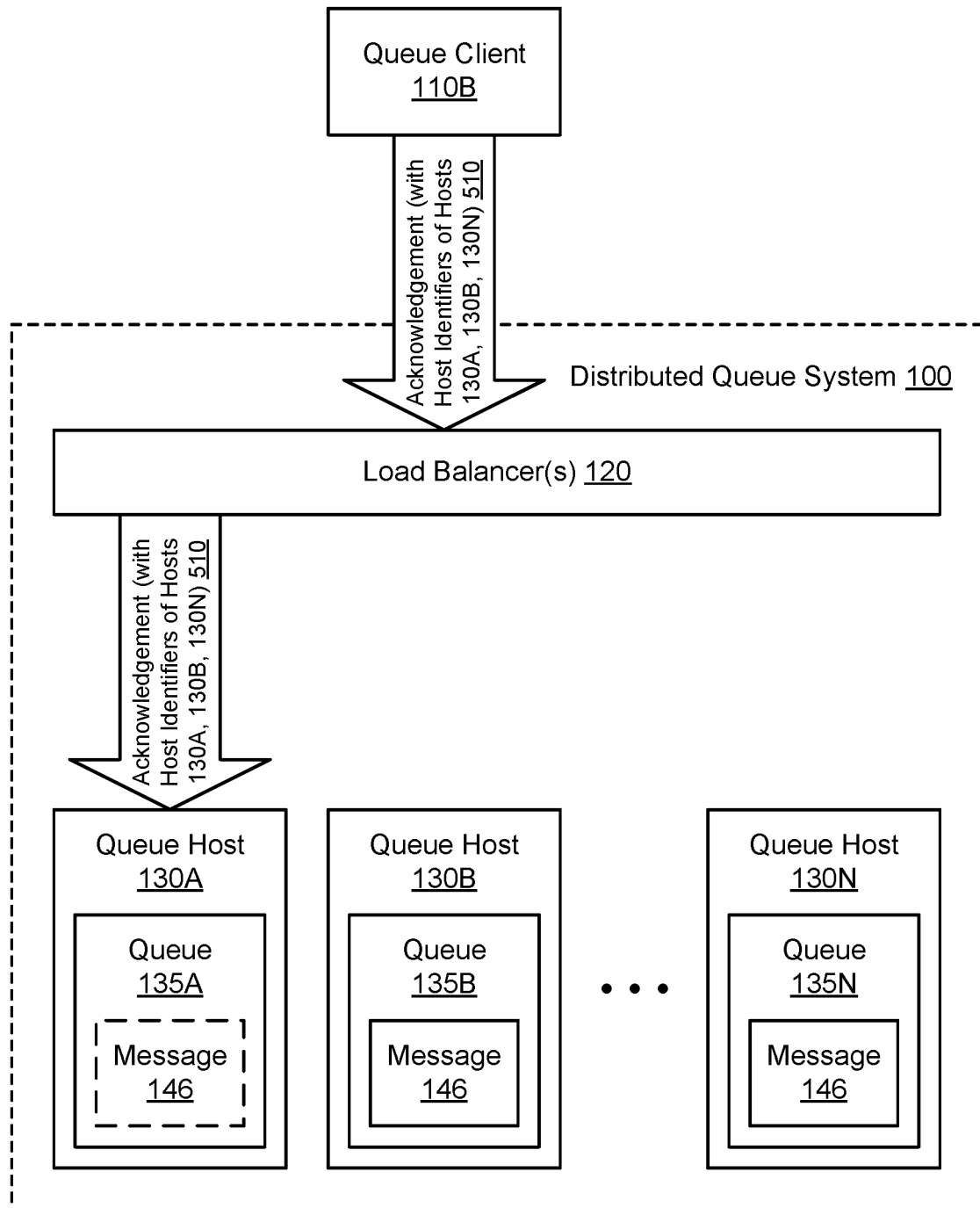
FIG. 5A illustrates an example of processing an acknowledgement of message processing in a highly available distributed queue using replicated messages, including one or more load balancers forwarding the acknowledgement to a queue host, according to one embodiment.

FIG. 5A illustrates an example of processing an acknowledgement of message processing in a highly available distributed queue using replicated messages, including one or more load balancers forwarding the acknowledgement to a queue host, according to one embodiment. The queue client 110B may send an acknowledgement 510 to the load balancer(s) 120. The acknowledgement 510 may indicate that the message referenced in the acknowledgement was successfully processed by the client 110B. The acknowledgement 510 may also include the host identifiers of all the queue hosts 130A, 130B, and 130N that store replicas of the message 146. In one embodiment, the queue client 110B may use any suitable interface(s) (e.g., an application programming interface) and/or interconnection(s) to send the acknowledgement 510 to the load balancer(s).

Upon receipt of the acknowledgement 510, the load balancer(s) 120 may use any suitable load balancing scheme (s) to select a queue host to receive the acknowledgement. In one embodiment, the load balancer(s) 120 may use a "least connections" load balancing scheme. In one embodiment, the load balancer(s) 120 may select a recipient from among the hosts indicated by the host identifiers in the acknowledgement 510. In another embodiment, the load balancer(s) 120 may select a recipient from among a broader set of hosts, potentially including hosts that do not store replicas of the message 146. In the example shown in FIG. 5A, the load balancer(s) may select queue host 130A and forward the acknowledgement 510 to the selected queue host. Upon receipt of the acknowledgement 510, the queue host 130A may destroy its replica (if it stores one) of the message 146. As used herein, destroying the message may include removing the message from the queue 135A, marking the message for deletion, or otherwise making the message unavailable to be delivered to a client.

Figure 5B:
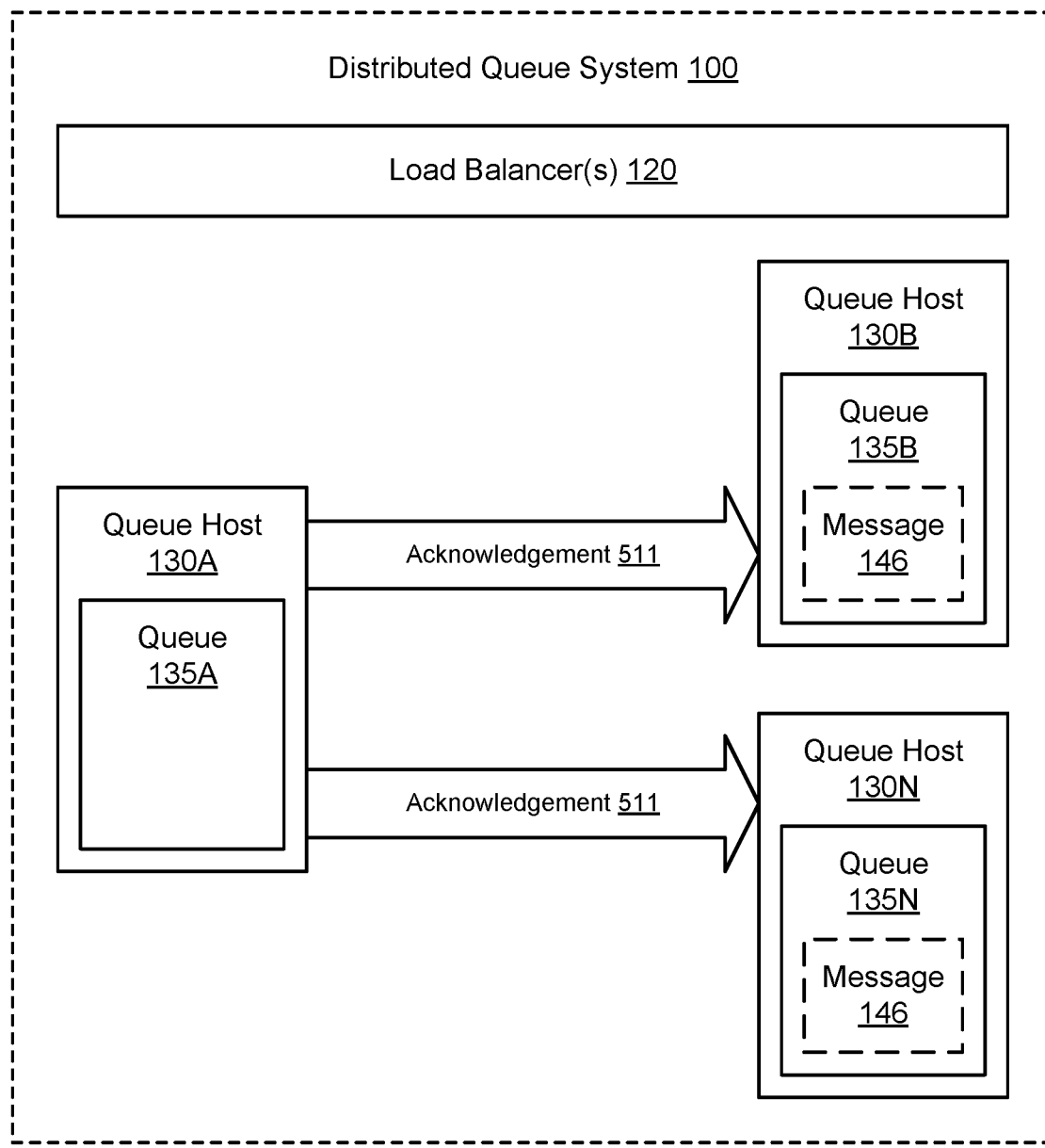
FIG. 5B illustrates an example of processing an acknowledgement of message processing in a highly available distributed queue using replicated messages, including the queue host forwarding the acknowledgement to other queue hosts, according to one embodiment.

FIG. 5B illustrates an example of processing an acknowledgement of message processing in a highly available distributed queue using replicated messages, including the queue host forwarding the acknowledgement to other queue hosts, according to one embodiment. As discussed above, the acknowledgement 510 may include the host identifiers of all the queue hosts 130A, 130B, and 130N that store replicas of the message 146. Using the host identifiers of the other queue hosts 130B and 130N, the queue host 130A may directly send acknowledgements 511 to the other hosts to request destruction of the other replicas of the message 146. Upon receipt of the acknowledgements 511, the queue hosts 130B and 130N may destroy their respective replicas of the message 146. In one embodiment, destruction of all replicas is not guaranteed by the queue system 100, and clients 110A-110N are expected to be tolerant of processing replicas of the same message.

Figure 6A:
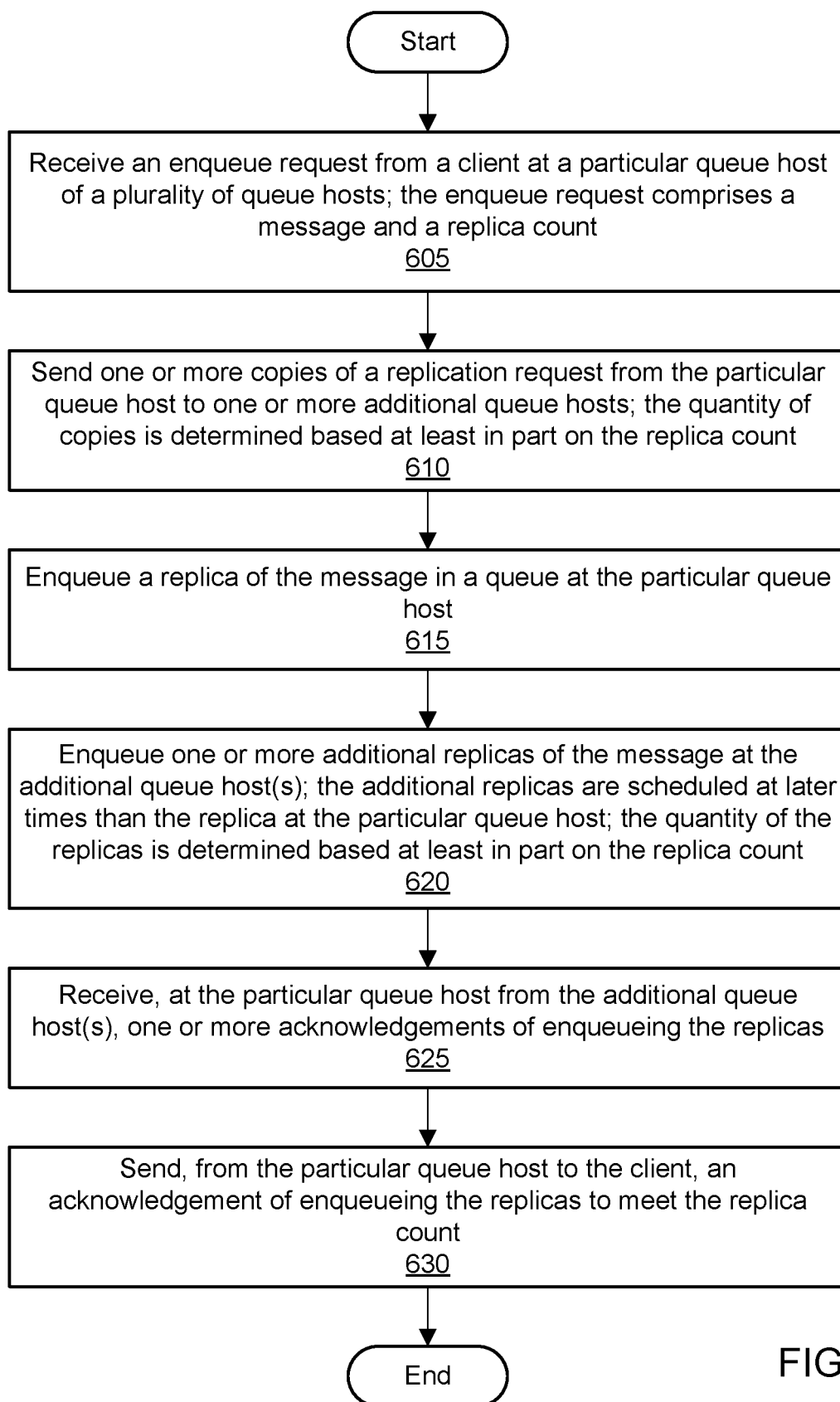
FIG. 6A is a flowchart illustrating a method for implementing a highly available distributed queue using replicated messages, according to one embodiment.

FIG. 6A is a flowchart illustrating a method for implementing a highly available distributed queue using replicated messages, according to one embodiment. As shown in 605, an enqueue request may be received from a client. The enqueue request may be received at a particular queue host of a plurality of queue hosts. In one embodiment, the enqueue request may be received from the client by one or more load balancers and then forwarded to the particular queue host. The particular queue host may be selected from the plurality of queue hosts by the one or more load balancers based at least in part on a load balancing scheme. The enqueue request may include a message that specifies one or more tasks, instructions, or operations to be performed. The enqueue request may include a replica count, e.g., a representation of a number greater than one.

As shown in 610, one or more copies of a replication request may be sent from the particular queue host to one or more additional queue hosts. At least one of the additional queue hosts may be selected from the plurality of queue hosts by the one or more load balancers based at least in part on a load balancing scheme. The replication request may include a copy of the message. The replication request may also include a reduced replica count, e.g., one. A quantity of the copies of the replication request may be determined based at least in part on the replica count of the enqueue request. As shown in 615, a replica of the message (also referred to herein as the initial replica) may be enqueued by placing it in a queue at the particular queue host. As shown in 620, one or more additional replicas of the message may be enqueued at the one or more additional queue hosts. A quantity of the one or more replicas may be determined based at least in part on the replica count of the enqueue request, e.g., such that the requested replica count is satisfied using the plurality of queue hosts. Various ones of the replicas may be scheduled for availability at different points in time. In one embodiment, the first replica to be enqueued (e.g., at the particular queue host) may be scheduled for immediate availability, and each of the additional replicas may be scheduled at increasingly later times. For example, each subsequent replica may be scheduled for availability at approximately N minutes after the previously created replica. Any suitable technique may be used to schedule the replicas, including the use of metadata in the replication requests as generated by the particular queue host.

As shown in 625, one or more acknowledgements of enqueuing the additional replicas may be received at the particular queue host from the one or more additional queue hosts. In one embodiment, the one or more acknowledgements may include host identifiers of the one or more additional queue hosts. The host identifiers of the one or more additional queue hosts may be recorded or otherwise stored in a host availability data structure at the particular queue host. As shown in 630, an acknowledgement of enqueuing the replicas may be sent to the client. The acknowledgement may be sent from the particular queue host to the client using the one or more load balancers. The acknowledgement may include a host identifier of the particular queue host and the host identifiers of the one or more additional queue hosts.

Figure 6B:
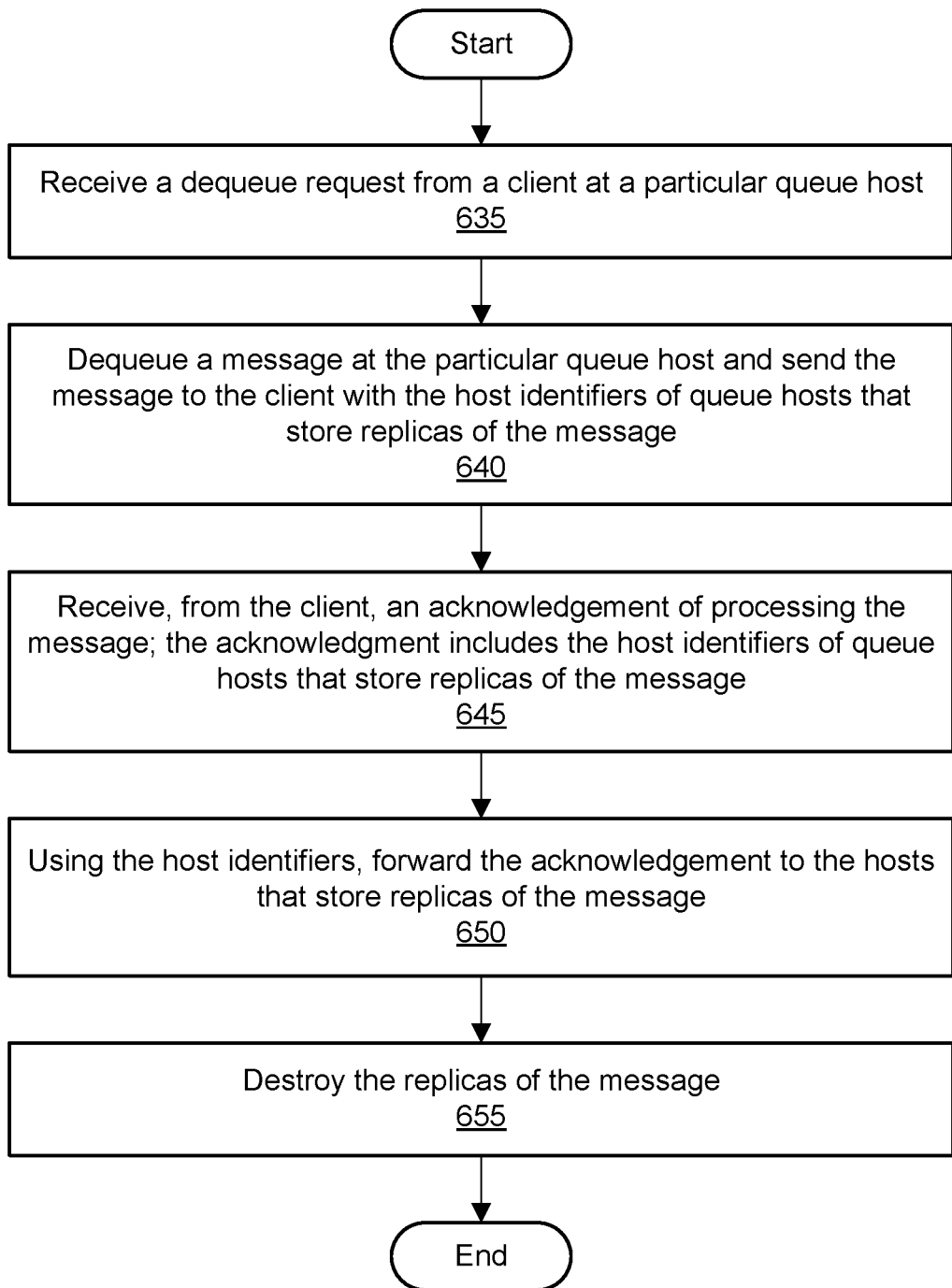
FIG. 6B is a flowchart illustrating further aspects of the method for implementing a highly available distributed queue using replicated messages, according to one embodiment.

FIG. 6B is a flowchart illustrating further aspects of the method for implementing a highly available distributed queue using replicated messages, according to one embodiment. As shown in 635, a dequeue request may be received from a client. The dequeue request may be received at a particular queue host of a plurality of queue hosts. In one embodiment, the dequeue request may be received from the client by one or more load balancers and then forwarded to the particular queue host. The particular queue host may be selected by the one or more load balancers to receive the dequeue request based at least in part on a load balancing scheme.

As shown in 640, a message may be dequeued at the particular queue host and sent to the client that issued the dequeue request. The message may be sent from the particular queue host to the client using the one or more load balancers. The message may include a host identifier of the particular queue host and the host identifiers of the one or more additional queue hosts that host the replicas of the message. After the message is dequeued but before the client acknowledges successful processing of the message, the message may remain in the queue but be locked, made invisible, or otherwise made unavailable for immediate delivery to clients. In one embodiment, the dequeued message may remain in the queue and be rescheduled for availability at a later time (e.g., in five or ten minutes) in case the client fails to process the message successfully.

As shown in 645, an acknowledgement of processing the message may be received from the client. The acknowledgement of processing the message may include the host identifier of the particular queue host and the host identifiers of the one or more additional queue hosts that host the replicas of the message. The acknowledgement may be received using the one or more load balancers and forwarded to a suitable one of the queue hosts, e.g., using a load balancing scheme.

As shown in 650, the acknowledgement of processing the message may be forwarded to the particular queue host and also to the one or more additional queue hosts that host the replicas of the message. The particular queue host and the one or more additional queue hosts may be identified based at least in part on the host identifiers in the acknowledgement. As shown in 655, the message may be destroyed at the particular queue host and at the one or more additional queue hosts in response to receiving the acknowledgement of processing the message.

Figure 7:
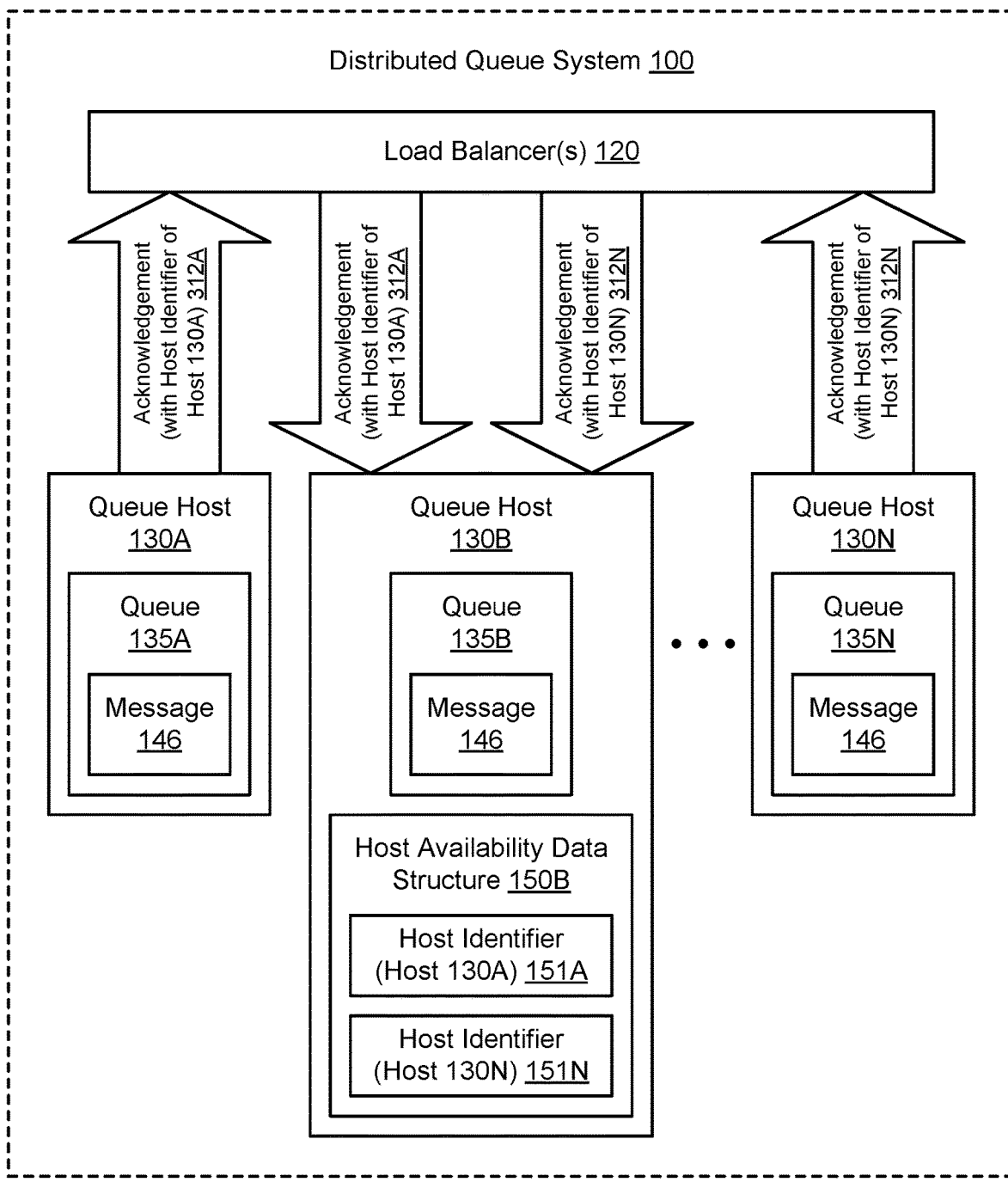
FIG. 7 illustrates an example of unseeded host discovery based on message replication in a highly available distributed queue using replicated messages, according to one embodiment.

FIG. 7 illustrates an example of unseeded host discovery based on message replication in a highly available distributed queue using replicated messages, according to one embodiment. Queue hosts 130A-130N may identify themselves to the load balancer(s) 120, e.g., at initialization. At initialization, a queue host may know of no other queue hosts, and discovery of other queue hosts may occur through an unseeded discovery process using normal queue-related tasks that are sent through the load balancer(s) 120. For example, hosts may discover peers by receiving host identifiers in acknowledgements of replica generation and message processing.

As discussed above, the secondary host 130A may send an acknowledgement 312A of message enqueuing to the load balancer(s) 120, and the secondary host 130N may send an acknowledgement 312N of message enqueuing to the load balancer(s) 120. As shown in FIG. 7, the load balancer(s)

may forward these acknowledgements 312A and 312N to the primary host 130B. In this manner, the primary host 130B may verify that the proper number of replicas have been created (in accordance with the replica count in the enqueue request 310). The primary host 310B may also obtain the host identifiers of the secondary hosts 310A and 310N as specified in the acknowledgements 312A and 312N. The host identifiers may include any suitable information to identify the respective hosts, including a network address or hostname that is unique within the provider network and/or distributed queue system 100.

In one embodiment, any of the queue hosts 130A-130N may maintain a host availability data structure (e.g., a table or list) that includes one or more host identifiers of other queue hosts. For example, the queue host 130B may maintain a host availability data structure 150B. The queue host 130B may populate the host availability data structure 150B with an entry 151A that includes the host identifier for the queue host 130A and an entry 151N that includes the host identifier for the queue host 130A. In one embodiment, the entries 151A-151N may also indicate an availability of the corresponding host, e.g., for performing queue-related tasks such as enqueuing replicas of messages. For at least some replication requests, the queue host 130B may bypass the load balancer(s) 120 and use the host identifiers in the host availability data structure 150B to select recipients of replication requests.

Figure 8:
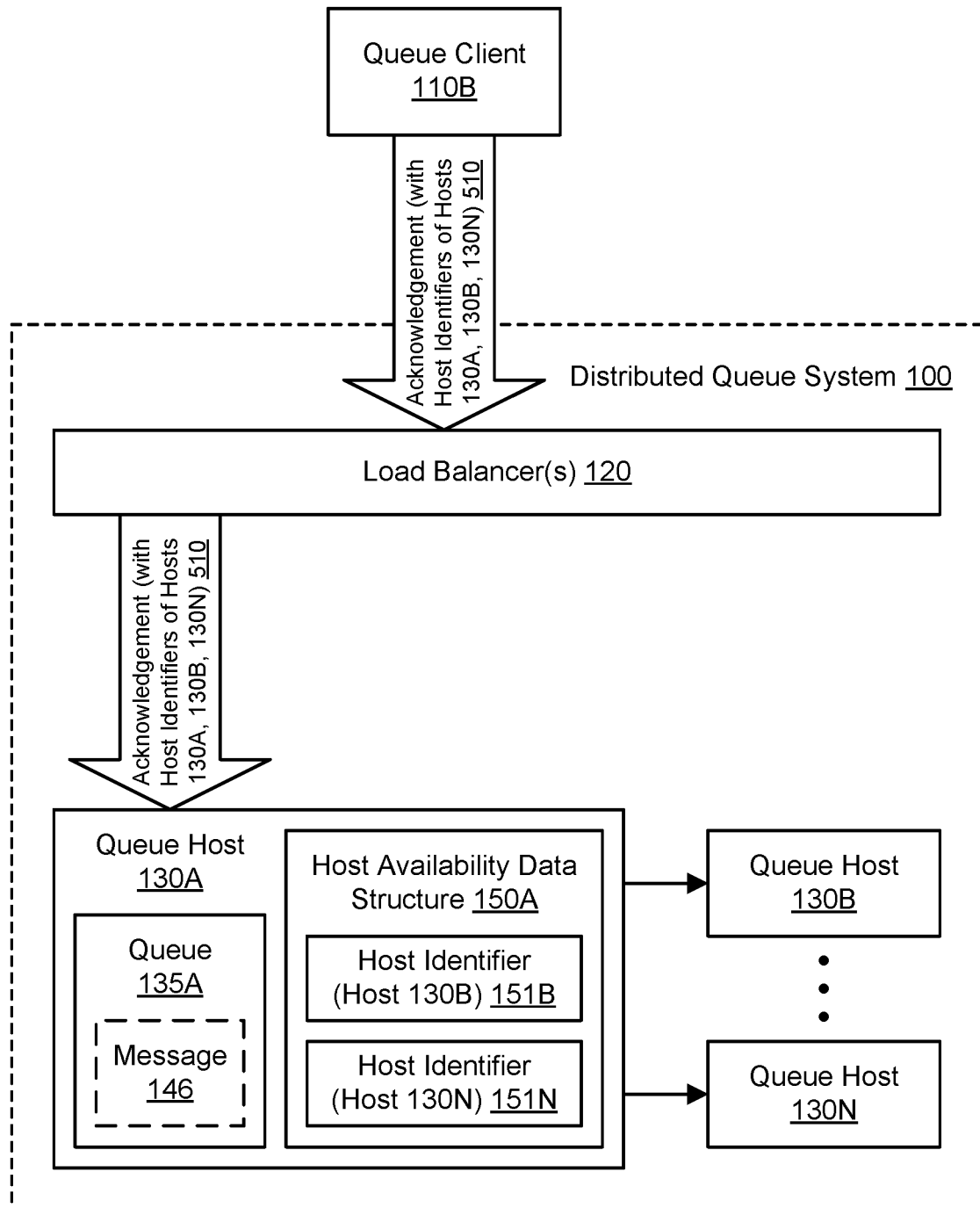
FIG. 8 illustrates an example of unseeded host discovery based on message processing acknowledgement in a highly available distributed queue using replicated messages, according to one embodiment.

FIG. 8 illustrates an example of unseeded host discovery based on message processing acknowledgement in a highly available distributed queue using replicated messages, according to one embodiment. As discussed above, the queue client 110B may send an acknowledgement 510 to the load balancer(s) 120. The acknowledgement 510 may indicate that the message referenced in the acknowledgement was successfully processed by the client 110B. The acknowledgement 510 may also include the host identifiers of all the queue hosts 130A, 130B, and 130N that store replicas of the message 146. In one embodiment, the host identifiers in the acknowledgement may be encrypted or encoded so that entities outside the distributed queue system 100 (e.g., queue clients 110A-110N) are prevented from identifying or initiating direct communication with the hosts.

Upon selection by the load balancer(s) 120 and receipt of the acknowledgement 510, the queue host 130A may destroy its replica of the message 146. Using the host identifiers of the other hosts 130B and 130N that store replicas of the message 146, the queue host 130A may directly send acknowledgements to request destruction of the remaining replicas. Additionally, the queue host 130A may populate a host availability data structure 150A with an entry 151B that includes the host identifier for the queue host 130B and an entry 151N that includes the host identifier for the queue host 130A. In one embodiment, the entries 151B-151N may also indicate an availability of the corresponding host, e.g., for performing queue-related tasks such as enqueuing replicas of messages. For at least some replication requests, the queue host 130A may bypass the load balancer(s) 120 and use the host identifiers in the host availability data structure 150A to select recipients of replication requests.

Figure 9:
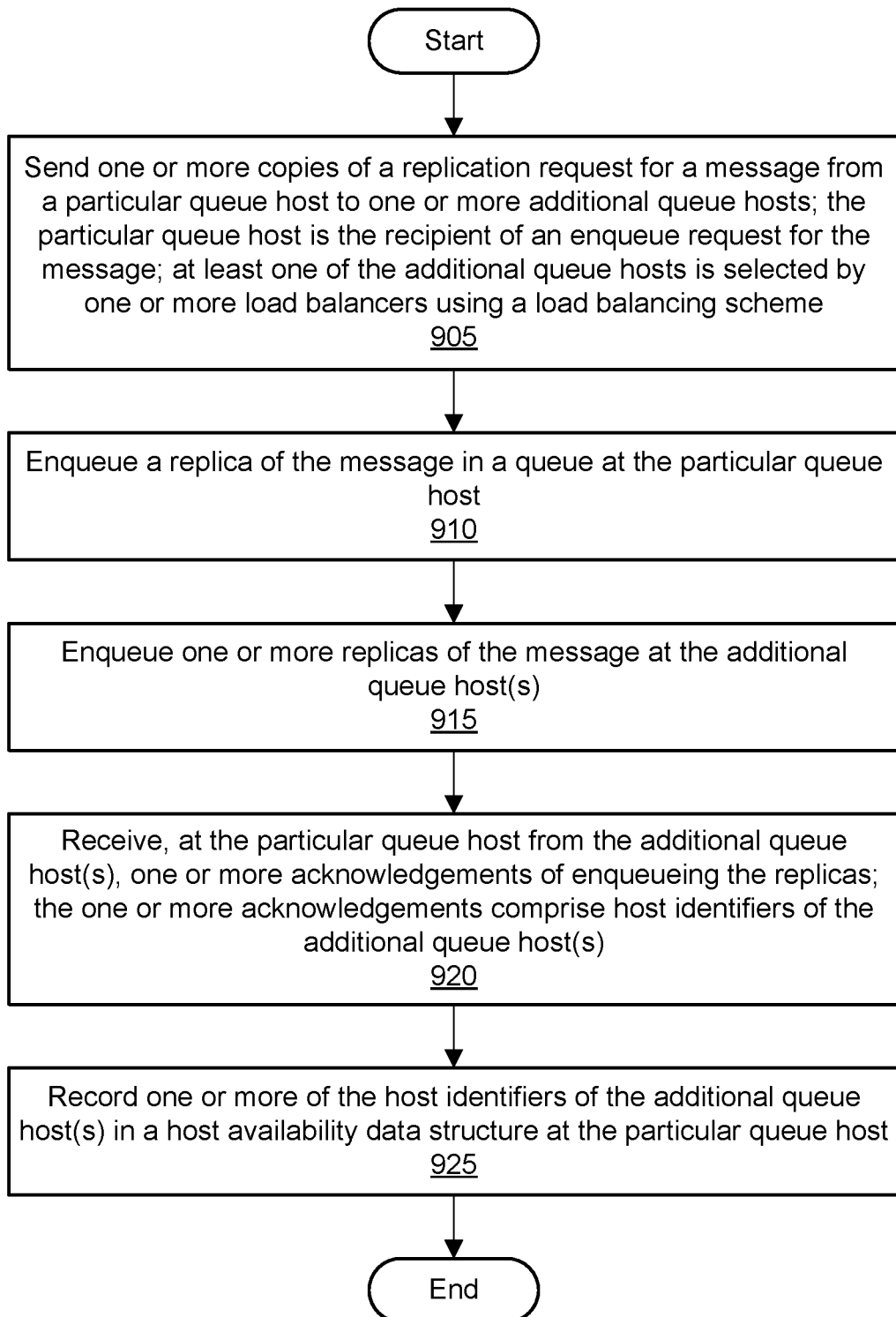
FIG. 9 is a flowchart illustrating a method for unseeded host discovery in a highly available distributed queue using replicated messages, according to one embodiment.

FIG. 9 is a flowchart illustrating a method for unseeded host discovery in a highly available distributed queue using replicated messages, according to one embodiment. A particular queue host of a plurality of queue hosts may receive an enqueue request for a message from a client. The message may specify one or more tasks, instructions, or operations to be performed. The enqueue request may also include a replica count, e.g., a number greater than one. As shown in 905, one or more copies of a replication request may be sent from the particular queue host to one or more additional queue hosts. At least one of the additional queue hosts may be selected from the plurality of queue hosts by the one or more load balancers based at least in part on a load balancing scheme. The replication request may include the message. The replication request may also include a reduced replica count, e.g., one. A quantity of the copies of the replication request may be determined based at least in part on the replica count of the enqueue request.

As shown in 910, a replica of the message may be enqueued in a queue at the particular queue host. As shown in 915, one or more additional replicas of the message may be enqueued at the one or more additional queue hosts. A quantity of the one or more replicas may be determined based at least in part on the replica count of the enqueue request, e.g., such that the requested replica count is satisfied using the plurality of queue hosts.

Various ones of the replicas may be scheduled for availability at different points in time. In one embodiment, the first replica to be enqueued (e.g., at the particular queue host) may be scheduled for immediate availability, and each of the additional replicas may be scheduled at increasingly later times. For example, each subsequent replica may be scheduled for availability at approximately N minutes after the previously created replica. Any suitable technique may be used to schedule the replicas, including the use of metadata in the replication requests as generated by the particular queue host As shown in 920, one or more acknowledgements of enqueuing the replicas may be received at the particular queue host from the one or more additional queue hosts. In one embodiment, the one or more acknowledgements may include host identifiers of the one or more additional queue hosts. As shown in 925, recording one or more of the host identifiers of the one or more additional queue hosts in a host availability data structure at the particular queue host. When additional replication requests (e.g., for newer messages) are sent from the particular queue host, the host availability data structure may be referenced to select and/or identify one or more other queue hosts to store replicas. Similarly, the host availability data structure may be populated with host identifiers found in other queue-related communications, such as acknowledgements of successful message processing.

Figure 10:
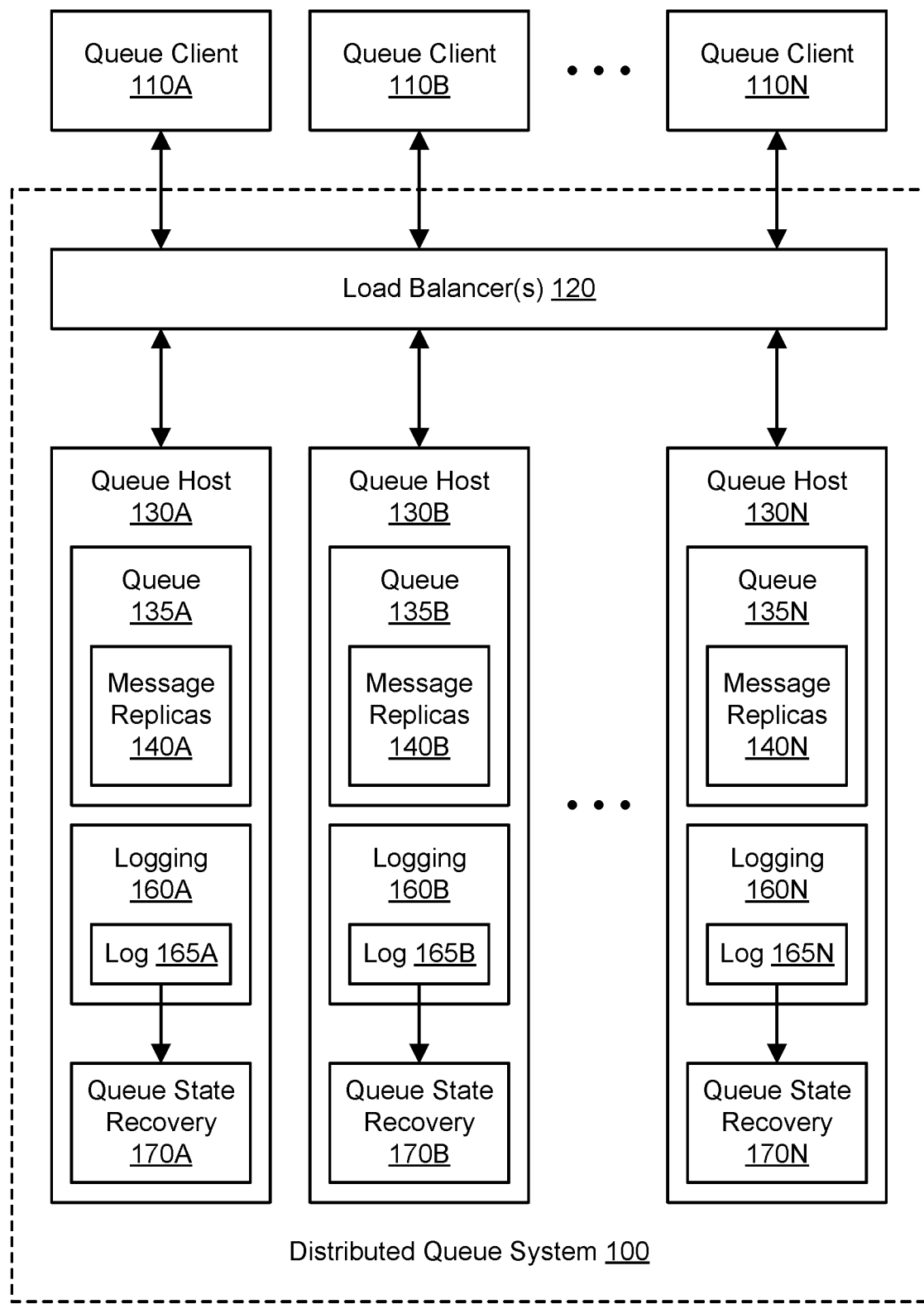
FIG. 10 illustrates an example of queue state logging and recovery in a highly available distributed queue using replicated messages, according to one embodiment.

The state of a queue at a particular queue host may be logged, and the resulting log may be used for efficient recovery of the state of the queue. FIG. 10 illustrates an example of queue state logging and recovery in a highly available distributed queue using replicated messages, according to one embodiment. In one embodiment, each of the queue hosts 130A-130N may include a queue state logging functionality that stores and/or maintains a log of the local queue state. As shown in FIG. 10, for example, the queue host 130A may include a logging functionality 160A that maintains a log 165A, the queue host 130B may include a logging functionality 160B that maintains a log 165B, and the queue host 130N may include a logging functionality 160N that maintains a log 165N. Any suitable storage technologies may be used to implement the logging functionality 160A-160N. In one embodiment, the logging functionality 160A-160N at a corresponding queue host 130A-130N may capture various queue-related events and append corresponding log entries to the local log 165A-165N. In one embodiment, a log 165A-165N may be implemented as a text file, and each entry may correspond to a single line in the file. In one embodiment, the logs 165A-165N may be stored using any suitable storage resources accessible to the corresponding queue host, such as a locally accessible hard disk.

Additionally, each of the queue hosts 130A-130N may include a queue state recovery functionality that can restore the state of the local queue using the log for the corresponding queue host. As shown in FIG. 10, for example, the queue host 130A may include a queue state recovery functionality 170A that can restore the queue 135A based on the log 165A, the queue host 130B may include a queue state recovery functionality 170B that can restore the queue 135B based on the log 165B, and the queue host 130N may include a queue state recovery functionality 170N that can restore the queue 135N based on the log 165N. Restoring the state of a queue may include restoring the ordered set of message replicas (such as replicas 140A-140N) found in the queue at the point in time to which the queue is restored. Restoration of the state of a queue may be desired, for example, after a failure at the corresponding queue host.

Figure 11:
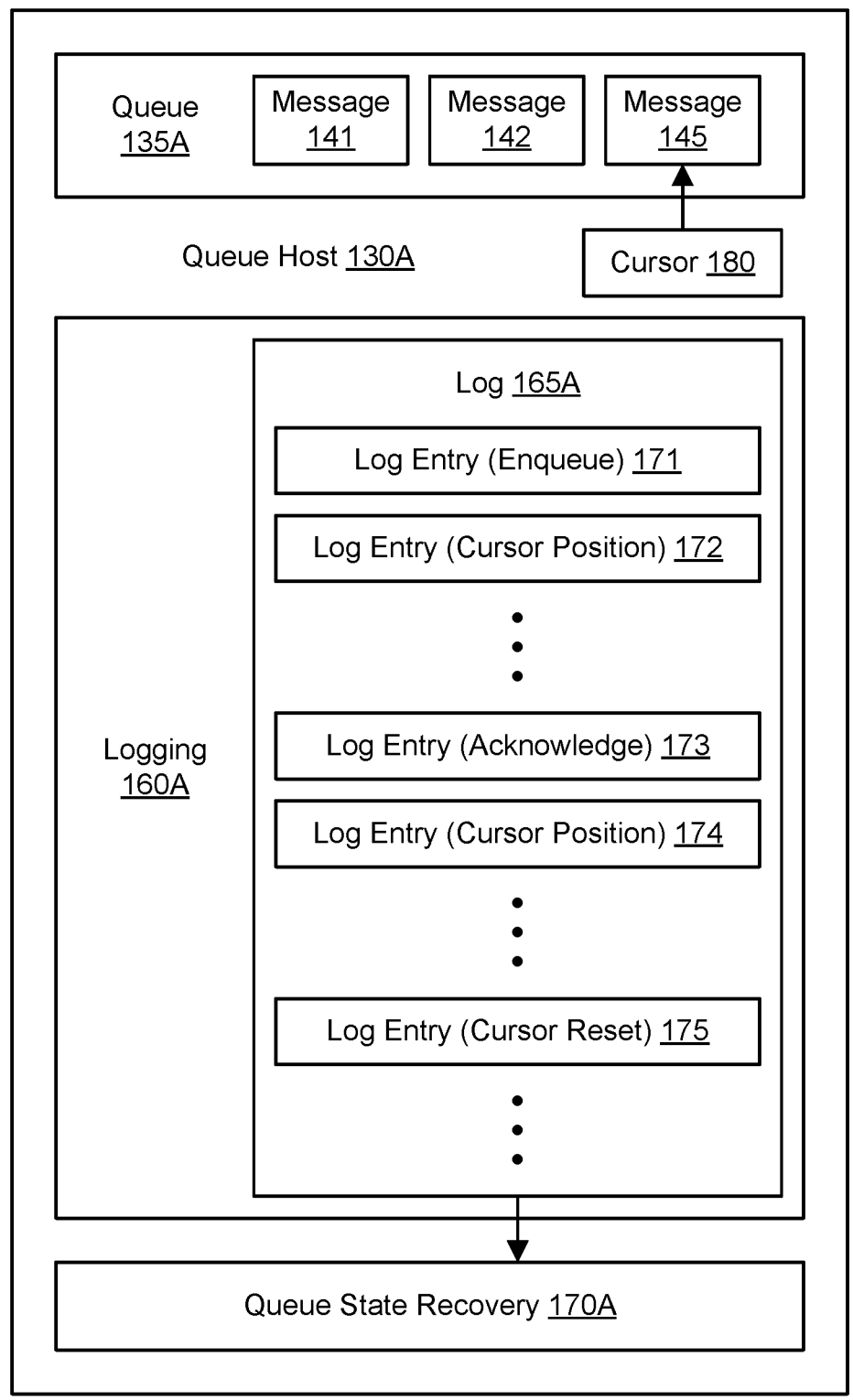
FIG. 11 illustrates an example of log entries in a queue state log in a highly available distributed queue using replicated messages, according to one embodiment.

FIG. 11 illustrates an example of log entries in a queue state log in a highly available distributed queue using replicated messages, according to one embodiment. At a queue host such as queue host 130A, the queue 135A may store a set of messages such as messages 141, 142, and 145. The logging functionality 160A may maintain a log 165A and store log entries corresponding to events that relate to the queue 135A. In one embodiment, the log entries may correspond to events that add messages to the queue and/or remove messages from the queue. In other words, log entries may be created based on receipt by a queue host of an enqueue request (including a replication request) and/or an acknowledgement of message processing by a client. In one embodiment, log entries may not be created for dequeue events because dequeued messages may remain in the queue (but be unavailable to other clients) until they are destroyed upon acknowledgement of successful message processing. For example, the log 165A may include a log entry 171 representing an enqueued message and a log entry 173 representing a message removed from the queue in response to an acknowledgement. The log entry 171 may include an indication of the enqueue operation (e.g., ENQ) and a reference to or identification of the message that was enqueued in the operation. The log entry 173 may include an indication of the acknowledgement operation (e.g., ACK) and a reference to or identification of the message that was destroyed or remove from the queue in the operation. The log entries 171 and 173 may also include approximate timestamps of the operation, lists of hosts for replicas of the affected message, and any other suitable metadata.

In one embodiment, the queue host 130A and/or logging functionality 160A may track the items in the queue 135A using a cursor 180. The cursor 180 may represent a position in the queue 135A and/or a message in the queue at a particular time. For the first message added to the queue 135A, the cursor 180 may be positioned on that item. For each log entry that corresponds to an operation that alters the contents of the queue 135A (e.g., the log entries 171 and 173), the logging functionality 160A may also store a log entry that indicates the current position of the cursor. For example, when the log entry 171 is stored to indicate an enqueued message, another log entry 172 may be stored to indicate the message in the queue at which the cursor is currently positioned. Similarly, when the log entry 173 is stored to indicate a destroyed message, another log entry 174 may be stored to indicate the message in the queue at which the cursor is currently positioned. After each log entry for an operation that alters the contents of the queue and the related log entry for the cursor position, the cursor may be advanced, e.g., by one message. If the cursor is positioned on a message that is destroyed by an acknowledgement, the cursor may be advanced, e.g., by one message. If the cursor is advanced beyond the final message in the queue and/or back to the beginning, the cursor may be considered reset, and a log entry 175 corresponding to the reset may be added to the log 165A. In one embodiment, the log entry 175 for the cursor reset may be a blank line. The log 165A may include multiple log entries representing cursor resets.

When the queue state recovery functionality 170A seeks to restore the state of the queue 135A, the recovery functionality may begin at the end of the log 165A and scan backwards to find the next-to-last (or penultimate) log entry for a cursor reset. The queue state recovery functionality 170A may replay the entries in the log 165A (e.g., by adding messages to the queue 135A and/or removing messages from the queue) from that log entry for the cursor reset to the end of the log. In this manner, the state of a queue may be restored efficiently using only a portion of the log.

Figure 12:
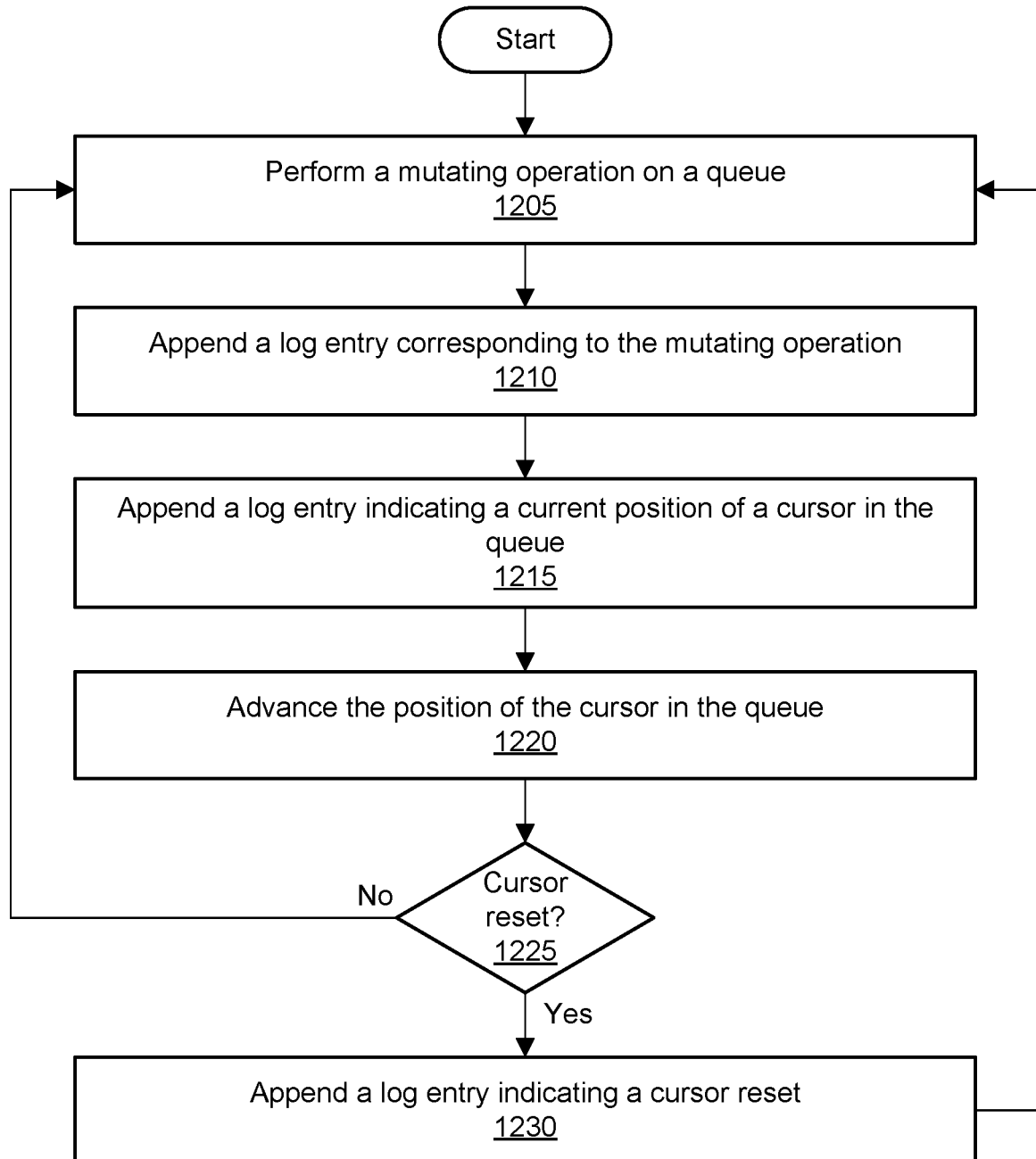
FIG. 12 is a flowchart illustrating a method for queue state logging in a highly available distributed queue using replicated messages, according to one embodiment.

FIG. 12 is a flowchart illustrating a method for queue state logging in a highly available distributed queue using replicated messages, according to one embodiment. At a particular queue host, a plurality of enqueue requests and a plurality of acknowledgements of message processing may be received over time. Enqueue requests and acknowledgements of message processing may collectively be referred to herein as mutating operations. As shown in 1205, a mutating operation may be performed on the queue at a particular queue host, e.g., to add a message to the local queue or remove a message from the local queue.

As shown in 1210, a log entry corresponding to the mutating operation may be appended to the log. As shown in 1215, a log entry indicating the current position of a cursor in the queue may also be appended to the log. As shown in 1220, the position of the cursor may be advanced, e.g., by moving the cursor to the next message in the queue. As shown in 1225, it may be determined if the cursor has been reset by being advanced to the end of the queue. If so, then as shown in 1230, a log entry indicating a cursor reset may be appended to the log. The method may return to the operation shown in 1205 for additional logging.

Illustrative Computer System

In at least some embodiments, a computer system that implements a portion or all of one or more of the technologies described herein may include a general-purpose computer system that includes or is configured to access one or more computer-readable media. FIG. 13 illustrates such a general-purpose computing device 5000. In the illustrated embodiment, computing device 5000 includes one or more processors 5010 (e.g., processors 5010A and 5010B through 5010N) coupled to a system memory 5020 via an input/output (I/O) interface 5030. Computing device 5000 further includes a network interface 5040 coupled to I/O interface 5030.

In various embodiments, computing device 5000 may be a uniprocessor system including one processor 5010 or a multiprocessor system including several processors 5010 (e.g., two, four, eight, or another suitable number). Processors 5010 may include any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store program instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 5020 as code (i.e., program instructions) 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computing device 5000 and other devices 5060 attached to a network or networks 5050, such as other computer systems or devices as illustrated in FIG. 1, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 5000 via I/O interface 5030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 5000 as system memory 5020 or another type of memory. Further, a computer-readable medium may include transmission media or signals such as electrical, electromagnetic, or digital signals, conveyed via a communication medium such as a network and/or a wireless link, such as may be implemented via network interface 5040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices having one or more respective hardware processors and associated memory, configured to implement a distributed queue system, wherein the distributed queue system comprises a plurality of queue hosts, the distributed queue system is configured to:
store a plurality of messages in a queue, wherein individual ones of the plurality of messages are stored in replicas on multiple ones of the plurality of queue hosts;
receive, at a particular queue host, a dequeue request from a client that specifies a message type of a message to be dequeued from the queue;
return, by the particular queue host, an acknowledgment of the dequeue request, wherein the acknowledgment includes (a) a dequeued message of the message type from the queue and (b) a list of host identifiers of all queue hosts that store a replica of the dequeued message; and
make the dequeued message unavailable in the queue without removing the dequeued message from the queue.

2. The system of claim 1, wherein the distributed queue system is configured to:
determine that the client has not provided a client acknowledgement within a specified period of time after the acknowledgment indicating that the dequeued message was successfully processed; and based at least in part on the determination, make the dequeued message available in the queue again.

3. The system of claim 1, wherein the distributed queue system comprises one or more load balancers, configured to:
receive the dequeue request from the client;
forward the dequeue request to the particular queue host, wherein the particular queue host is selected from the plurality of queue hosts based at least in part on a load balancing scheme;
receive the acknowledgement from the particular queue host; and
forward the acknowledgment to the client.

4. The system of claim 3, wherein the distributed queue system is configured to:
receive a client acknowledgement from the client at the one or more load balancers, wherein the client acknowledgment indicates that the dequeued message was successfully processed and includes the list of host identifiers;
forward the client acknowledgement from the one or more load balancers to one of the queue hosts specified in the list of host identifiers;
destroy a replica of the dequeued message at the one queue host and one or more additional replicas of the dequeued message at one or more additional queue hosts specified in the list of host identifiers based at least in part on the client acknowledgement.

5. The system of claim 4, wherein the one or more load balancers is configured to select the one queue host based at least in part on a lease connections load balancing scheme.

6. The system of claim 4, wherein the one queue host is configured to forward the client acknowledgment to the one or more additional queue hosts based at least in part on the list of host identifiers.

7. A computer-implemented method, comprising:
performing, via a particular queue host of a plurality of queue hosts of a distributed queue system:
storing messages in a queue, wherein individual ones of the messages are stored in replicas on other ones of the plurality of queue hosts;
receiving a dequeue request from a client, wherein the dequeue request specifies a message type of a message to be dequeued from the queue;
returning an acknowledgment of the dequeue request, wherein the acknowledgment includes (a) a dequeued message of the message type from the queue and (b) a list of host identifiers for the plurality of queue hosts that store a replica of the dequeued message; and
making the dequeued message unavailable in the queue without removing the dequeued message from the queue.

8. The method of claim 7, further comprising:
determining that the client has not provided a client acknowledgement indicating that the dequeued message was successfully processed within a specified period of time after the acknowledgment; and
based at least in part on the determination, making the dequeued message available in the queue again.

9. The method of claim 7, further comprising:
receiving, at one of the plurality of queue hosts, a client acknowledgement from the client indicating that the dequeued message was successfully processed and including the list of host identifiers;
destroying a replica of the dequeued message at the one queue host;
forwarding the client acknowledgment from the one queue host to one or more additional queue hosts based at least in part on the list of host identifiers; and
destroying the one or more additional replicas of the dequeued message at the one or more additional queue hosts specified in the list of host identifiers.

10. A method of claim 7, further comprising:
performing, via one or more load balancers of the distributed queue system:
receiving the dequeue request from the client; and
forwarding the dequeue request to the particular queue host, wherein the particular queue host is selected from the plurality of queue hosts based at least in part on a load balancing scheme.

11. The method of claim 10, further comprising:
performing, via the one or more load balancers:
receiving a client acknowledgement from the client indicating that the dequeued message was successfully processed; and
forwarding the client acknowledgement to the one queue host, wherein the one queue host is selected based at least in part on a lease connections load balancing scheme.

12. The method of claim 7, further comprising:
performing, via the particular queue host:
performing a mutating operation on the queue;
appending a first log entry to a log corresponding to the mutating operation;
appending a second log entry indicating a current position of a cursor in the queue at a time of the mutating operation;
advancing the cursor to a next position in the queue; and
responsive to a determination that the cursor has advanced beyond a final message in the queue, appending a third log entry indicating a cursor reset.

13. The method of claim 12, further comprising:
performing a recovery of a queue state of the particular queue host, including:
scanning the log backwards to determine a penultimate log entry before the third log entry; and
replaying log entries in forward order from the penultimate log entry.

14. A non-transitory computer-readable storage medium storing program instructions that when executed on one or more processors of a particular queue host of a distributed queue system, cause the particular queue host to:
store a plurality of messages in a queue, wherein individual ones of the plurality of messages are stored in replicas on multiple ones of the plurality of queue hosts;
receive a dequeue request from a client, wherein the dequeue request specifies a message type of a message to be dequeued from the queue;
send an acknowledgment of the dequeue request, wherein the acknowledgment includes (a) a dequeued message of the message type from the queue and (b) a list of host identifiers for other queue hosts of a distributed queue system that store a replica of the dequeued message; and
make the dequeued message unavailable in the queue without removing the dequeued message from the queue.

15. The non-transitory computer-readable storage medium of claim 14, wherein the program instructions when executed on the one or more processors cause the particular queue host to:

determine that the client has not provided a client acknowledgement indicating that the dequeued message was successfully processed within a specified period of time after the acknowledgment; and based at least in part on the determination, make the dequeued message available in the queue again.

16. The non-transitory computer-readable storage medium of claim 14, wherein the program instructions when executed on the one or more processors cause the particular queue host to:

receive a client acknowledgement indicating that the dequeued message was successfully processed and including the list of host identifiers;

destroy a replica of the dequeued message at the one queue host; and forward the client acknowledgment from the one queue host to one or more additional queue hosts indicated by the list of host identifiers to destroy one or more additional replicas of the dequeued message at the one or more additional queue hosts.

17. The non-transitory computer-readable storage medium of claim 14, wherein the program instructions when executed on the one or more processors cause the particular queue host to:

perform a mutating operation on the queue;

append a first log entry to a log corresponding to the mutating operation;

append a second log entry indicating a current position of a cursor in the queue at a time of the mutating operation;

advance the cursor to a next position in the queue; and responsive to a determination that the cursor has advanced beyond a final message in the queue, append a third log entry indicating a cursor reset.

18. The non-transitory computer-readable storage medium of claim 17, wherein the program instructions when executed on the one or more processors cause the particular queue host to:

perform a recovery of a queue state of the particular queue host to:

scan the log backwards to determine a penultimate log entry before the third log entry; and replay log entries in forward order from the penultimate log entry.

19. The non-transitory computer-readable storage medium of claim 14, wherein the program instructions when executed on the one or more processors cause the particular queue host to:

receive an enqueue request from the client, wherein the enqueue request specifies the message and a replica count;

store a replica of the message at the particular queue host; and send one or more replication requests to one or more other queue hosts of a distributed queue system based at least in part on the replica count, wherein the replication requests cause the one or more other queue hosts to store additional replicas of the message.

20. The non-transitory computer-readable storage medium of claim 19, wherein the program instructions when executed on the one or more processors cause the particular queue host to:

receive from the one or more other queue hosts one or more acknowledgements of the replication requests, wherein the one or more acknowledgements of the replication requests comprise one or more host identifiers of the one or more other queue hosts;

record the one or more host identifiers in a host availability data structure at the particular queue host; and send an acknowledgement of the enqueue request that includes the one or more host identifiers of the one or more other queue hosts.

* * * * *